US008601379B2

(12) United States Patent
Marks et al.

(10) Patent No.: US 8,601,379 B2
(45) Date of Patent: Dec. 3, 2013

(54) METHODS FOR INTERACTIVE COMMUNICATIONS WITH REAL TIME EFFECTS AND AVATAR ENVIRONMENT INTERACTION

(75) Inventors: Richard Marks, Foster City, CA (US); Gary M. Zalewski, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 1086 days.

(21) Appl. No.: 11/800,843

(22) Filed: May 7, 2007

(65) Prior Publication Data
US 2007/0260984 A1    Nov. 8, 2007

Related U.S. Application Data

(60) Provisional application No. 60/746,640, filed on May 7, 2006, provisional application No. 60/746,773, filed on May 8, 2006, provisional application No. 60/746,777, filed on May 8, 2006.

(51) Int. Cl.
| | |
|---|---|
| G06F 3/00 | (2006.01) |
| G06F 3/048 | (2013.01) |
| G06F 17/00 | (2006.01) |
| G06F 19/00 | (2011.01) |
| A63F 9/24 | (2006.01) |
| A63F 13/00 | (2006.01) |

(52) U.S. Cl.
USPC ................ 715/757; 715/706; 715/733; 463/1

(58) Field of Classification Search
USPC .............................. 715/706; 463/1
See application file for complete search history.

(56) References Cited

U.S. PATENT DOCUMENTS

| | | | | |
|---|---|---|---|---|
| 5,491,743 | A | * | 2/1996 | Shiio et al. ..................... 709/204 |
| 5,880,731 | A | * | 3/1999 | Liles et al. ..................... 715/758 |
| 6,215,498 | B1 | * | 4/2001 | Filo et al. ...................... 345/419 |
| 6,219,045 | B1 | | 4/2001 | Leahy et al. .................. 345/331 |
| 6,227,974 | B1 | * | 5/2001 | Eilat et al. ....................... 463/40 |
| 6,400,374 | B2 | | 6/2002 | Lanier ............................ 345/630 |
| 6,714,660 | B1 | | 3/2004 | Ohba ............................. 382/103 |
| 6,767,287 | B1 | | 7/2004 | McQuaid et al. ................ 463/42 |
| 7,073,129 | B1 | * | 7/2006 | Robarts et al. ................ 715/740 |
| 7,225,414 | B1 | * | 5/2007 | Sharma et al. ................ 715/863 |

(Continued)

*Primary Examiner* — Stephen Alvesteffer
(74) *Attorney, Agent, or Firm* — Martine Penilla Group, LLP

(57) ABSTRACT

Computer implemented method for interactively animating an avatar in response to real world input are provided. The avatar can be transmitted between a first user and a second user using a computer program that is executed on at least one computer in a computer network. Additionally, the first user and the second user each interact using a respective computing system that is at least partially executing the computer program. The method is initiated by identifying components of the avatar representing the first user that can be modified using real-time effects. The method continues by the computing system identifying controller input from either the first user or the second user. The identification of the controller input is used to determine which of the identified components of the avatar representing the first user will be modified. In response to the identified controller input the real-time effects are applied to the identified components of the avatar that represent the first user. The avatar of the first user augmented to reflect the application of the real-time effects. In another operation, the method displays the augmented avatar of the first user on a screen connected to the computing system of one or both of the first and second users.

19 Claims, 20 Drawing Sheets

(56) References Cited

U.S. PATENT DOCUMENTS

| | | |
|---|---|---|
| 7,395,507 B2 * | 7/2008 | Robarts et al. ............... 715/744 |
| 2001/0040591 A1 * | 11/2001 | Abbott et al. ................ 345/700 |
| 2002/0163531 A1 * | 11/2002 | Ihara et al. .................. 345/719 |
| 2002/0183961 A1 * | 12/2002 | French et al. ................ 702/150 |
| 2003/0156134 A1 * | 8/2003 | Kim ............................. 345/753 |
| 2004/0006767 A1 | 1/2004 | Robson et al. ................. 725/28 |
| 2004/0085259 A1 * | 5/2004 | Tarlton et al. ................. 345/2.3 |
| 2004/0179038 A1 * | 9/2004 | Blattner et al. .............. 345/751 |
| 2004/0240740 A1 | 12/2004 | Ohba ........................... 382/190 |
| 2005/0190188 A1 * | 9/2005 | Anzawa et al. ............... 345/474 |
| 2005/0266925 A1 * | 12/2005 | Hornell et al. ................. 463/42 |
| 2006/0178964 A1 * | 8/2006 | Jung et al. ...................... 705/35 |
| 2007/0003915 A1 * | 1/2007 | Templeman .................. 434/247 |
| 2007/0055490 A1 * | 3/2007 | Aoki et al. ........................ 704/3 |
| 2007/0074114 A1 * | 3/2007 | Adjali et al. .................. 715/706 |
| 2007/0087835 A1 * | 4/2007 | Van Luchene .................. 463/43 |
| 2007/0168863 A1 * | 7/2007 | Blattner et al. .............. 715/706 |
| 2007/0188502 A1 * | 8/2007 | Bishop .......................... 345/473 |
| 2007/0218987 A1 * | 9/2007 | Van Luchene et al. ......... 463/30 |

* cited by examiner

Marks APPLYING RTE TO m3rCy F1us]-[

506 508 Marks 502 m3rCy F1u5]-[ 504

MODIFY Marks L1

MODIFY m3rCy F1u5]-[ R1

FIG. 7A

Marks APPLYING RTE TO m3rCy F1us]-[

506 508 Marks 502 m3rCy F1u5]-[ 504

METHODS FOR INTERACTIVE COMMUNICATIONS WITH REAL TIME EFFECTS AND AVATAR ENVIRONMENT INTERACTION

CLAIM OF PRIORITY

The present application claims priority from (1) Provisional Application No. 60/746,640, entitled "METHODS AND SYSTEMS FOR PROCESSING AN INTERCHANGE OF REAL TIME EFFECTS DURING VIDEO COMMUNICATION", filed on May 7, 2006, (2) U.S. Provisional Application No. 60/746,773, titled METHODS AND SYSTEMS FOR INTERACTIVE COMMUNICATIONS WITH REAL TIME EFFECTS AND AVATAR ENVIRONMENT INTERACTION, filed on May 8, 2006, and (3) Provisional Application No. 60/746,777, entitled "SYSTEM AND METHOD FOR PROVIDING AFFECTIVE CHARACTERISTICS TO COMPUTER GENERATED AVATAR DURING GAMEPLAY" filed on May 8, 2006, each of which is herein incorporated by reference.

CROSS REFERENCE TO RELATED APPLICATIONS

The present application is related to U.S. patent application Ser. No. 11/800,899, entitled "METHODS AND SYSTEMS FOR PROCESSING AN INTERCHANGE OF REAL TIME EFFECTS DURING VIDEO COMMUNICATION", filed on the same date as the instant application and, U.S. patent application Ser. No. 11/801,036, entitled "SYSTEM AND METHOD FOR PROVIDING AFFECTIVE CHARACTERISTICS TO COMPUTER GENERATED AVATAR DURING GAMEPLAY" filed on the same date as the instant application, each of which is herein incorporated by reference.

BACKGROUND OF THE INVENTION

1. Field of the Invention

The present invention relates generally to interactive multimedia entertainment and more particularly, interactive user control and manipulation representations of users in a virtual space.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation or Sony Playstation2 (PS2), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet.

As game complexity continues to intrigue players, game and hardware manufacturers have continued to innovate to enable additional interactivity and computer programs. Some computer programs define virtual worlds. A virtual world is a simulated environment in which users may interact with each other via one or more computer processors. Users may appear on a video screen in the form of representations referred to as avatars. The degree of interaction between the avatars and the simulated environment is implemented by one or more computer applications that govern such interactions as simulated physics, exchange of information between users, and the like. The nature of interactions among users of the virtual world is often limited by the constraints of the system implementing the virtual world. It is within this context that embodiments of the invention arise.

SUMMARY

An invention is described for improving and enhancing verbal and non-verbal communications by applying automatic avatar animation effects in response to real world environmental stimuli and user-controlled application of Real-Time Effects (RTE) to avatars in a networked environment. The application of animations to an avatar, an icon that can be selected by a user to represent him or her, will enhance the communications experience. The communications may be video chat or text chat and may be standalone applications or bundled with interactive applications such as videogames. During a chat session, the avatars for the people involved can interact with real world stimuli occurring around the chat participants based on input received from microphones and video cameras. Additionally, the chat participants can interactively cause the application of an RTE on an avatar of a person he/she is communicating with or cause the application of an RTE on his/her own avatar in substantially real-time. An RTE can take on many forms, such as video pixel patches that can be integrated into specific portions of an avatar or pre-rendered effects that can be applied to an entire avatar. The video pixel patches are preferably applied in such a way that they integrate into the avatar, and therefore, the integration appears to be substantially done in real-time.

In one embodiment, a computer implemented method for interactively animating an avatar in response to real world input is described. The avatar can be transmitted between a first user and a second user using a computer program that is executed on at least one computer in a computer network. Additionally, the first user and the second user each interact using a respective computing system that is at least partially executing the computer program. The method is initiated by identifying components of the avatar representing the first user that can be modified using real-time effects. The method continues by identifying controller input from either the first user or the second user. The controller input detected by the computing system. The identification of the controller input determining which of the identified components of the avatar representing the first user will be modified. In response to the identified controller input the real-time effects are applied to the identified components of the avatar representing the first user. The avatar of the first user being augmented to reflect the application of the real-time effects. In another operation, the method displays the augmented avatar of the first user on a screen connected to the computing system of one or both of the first and second users.

In another embodiment, a computer implemented method for automatically modifying an avatar image in substantial real-time in conjunction with communication over a network is disclosed. The method is initiated by providing a video and audio capture system on a respective computing system of a first and a second users. The video and audio capture system interfaced with the computer program to enable the real-time communication. In another operation, the method detects real-time changes in facial expression of the first user in the captured video of the first user. In yet another operation, the method detects real-time changes in vocal characteristics of the first user. Another operation automatically applies real-time effects to the avatar image that represents the first user in response to the monitored real-time video and audio of the first user. The method concludes by outputting the avatar image that represents the first user with the automatically applied real-time effect on a screen connected to the computing system of one or both of the first and second users.

BRIEF DESCRIPTION OF THE DRAWINGS

The invention, together with further advantages thereof, may best be understood by reference to the following description taken in conjunction with the accompanying drawings.

FIGS. 7A-7C show how a user 508 (Marks) can apply a RTE to the avatar of the user 504 (m3rCy Flus]-[) in accordance with one embodiment of the present invention.

DETAILED DESCRIPTION

An invention is described for improving and enhancing verbal and non-verbal communications by applying automatic avatar animation effects in response to real world environmental stimuli and user-controlled application of Real-Time Effects (RTE) to avatars in a networked environment. The application of animations to an avatar, an icon that can be selected by a user to represent him or her, will enhance the communications experience. The communications may be video chat or text chat and may be standalone applications or bundled with interactive applications such as videogames. During a chat session, the avatars for the people involved can interact with real world stimuli occurring around the chat participants based on input received from microphones and video cameras. Additionally, the chat participants can interactively cause the application of an RTE on an avatar of a person he/she is communicating with or cause the application of an RTE on his/her own avatar in substantially real-time. An RTE, as will be described in greater detail below, is an effect that is selected by one of the participants of the chat, which can be applied and integrated into the avatar of one of the participants. The effect can take on many forms, such as video pixel patches that can be integrated into specific portions of an avatar or pre-rendered effects that can be applied to an entire avatar. The video pixel patches are preferably applied in such a way that they integrate into the avatar, and therefore, the integration appears to be substantially done in real-time. It will be obvious to one skilled in the art, that the present invention may be practiced without some or all of these specific details. In other instances, well known process operations have not been described in detail in order not to unnecessarily obscure the present invention.

Figure 1:
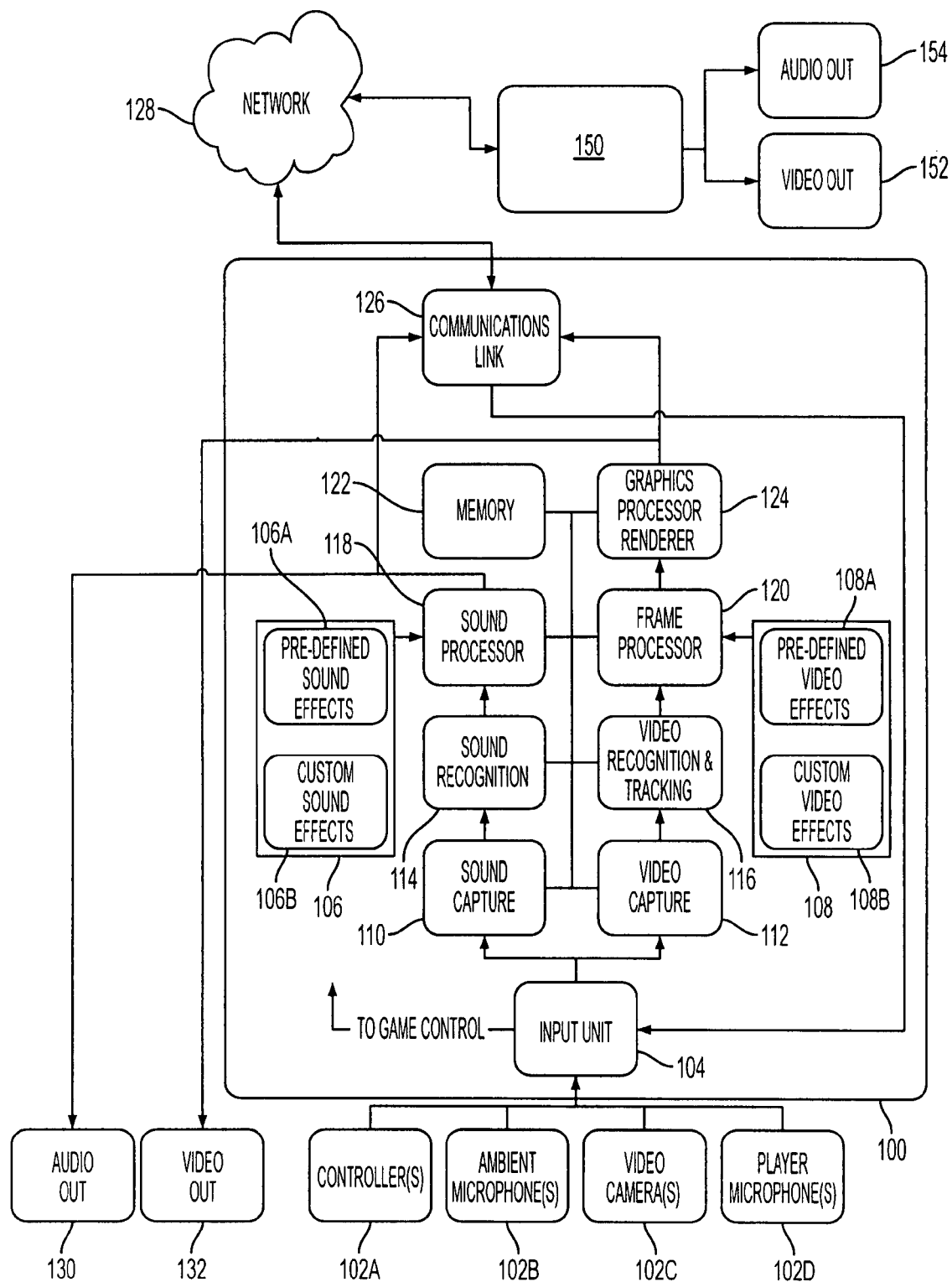
FIG. 1 is a simplified block diagram of a high level overview of a system for improving and enhancing verbal and non-verbal communications in accordance with one embodiment of the present invention.

FIG. 1 is a simplified block diagram of a high level overview of a system for improving and enhancing verbal and non-verbal communications in accordance with one embodiment of the present invention. As shown in FIG. 1, a system 100 is capable of inputting data from at least one controller 102A, at least one ambient microphone 102B, at least one video camera 102C, and at least one player microphone 102D.

The video input from the video camera 102C is initially fed into an input unit 104. The input unit can be in the form of circuitry or a software-controlled driver. The video input may then be passed to a video capture unit 112 and further processed by a video recognition and tracking unit 116. The video recognition and tracking unit 116 can recognize facial features and body parts of a user along with the movements of the user. Additionally, the video recognition and tracking unit 116 may be capable of capturing the background surroundings, and other elements within the captured images. A frame processor 120 uses the output from the video recognition and tracking unit 116 and can augment the image with video from a video effects library 108. The video effects library 108 contains at least two libraries shown as a pre-defined video effects 108A and custom video effects 108B, which can be selectively applied by the user or automatically applied by the system 100. It is possible for the video effects library 108 to contain fewer or more libraries so long as the libraries contain predefined and custom video effects. In operation, the frame processor outputs data to a graphics processor/renderer 124 that computes and outputs the final images displayed to the user, shown as video out 132. The graphics processor/renderer 124 also feeds information regarding the state of the system 100 to a communications link 126.

The audio input from the ambient microphones 102B and the player microphones 102D may be initially passed through the input unit 104 and then captured by a sound capture unit 110 that may pass the captured data to a sound recognition unit 114. Sound data may then be passed to a sound processor 118 that can also receive input from a sound effects library 106. The sound effects library 106 contains at least two libraries shown as predefined sound effects 106A and custom sound effects 106B that can be selectively applied by the user or automatically applied by the system 100. It is possible for the sound effect library to contain fewer or more libraries so long as it has predefined and custom audio effects. In one embodiment, the sound processor 118 outputs the final mixed sounds for the system 100, shown as audio out 130, and feeds information regarding the state of the system 100 to a communications link 126.

In one embodiment, the communications link 126 connects the system 100 to a network 128 that can connect system 100 with a remote system 150 that is capable of interfacing with the system 100 and is operated by a remote user (not shown). FIG. 1 shows the system 100 being connected to a single remote system 150 via the network 128, but it should be understood that a plurality of remote systems 150 and their corresponding users may be connected to system 100 via the network 128. The remote system 150 is capable of understanding the state of the system 100 based on data received from system 100. The remote system 150 combines the information regarding the state of the system 100 with input from the remote user before producing audio out 154 and video out 152.

The controllers 102A accept input from the users of the system 100 and the input may be processed simultaneously with the video and audio input. In one embodiment of the present invention the user presses a button or combination of buttons on the controller to initiate or apply an RTE. In another embodiment, an RTE is automatically initiated when triggered by an event defined in the software being processed by the system 100. As noted above, the RTE is an effect that is applied to the avatar of a user. For example, the RTE can be applied to a portion of an avatar's face, surroundings, etc., and the RTE is applied in substantially real-time. In such an example, the RTE may be applied such that the applied effect blends in to the avatar or the avatar's surroundings. The applied RTE may also be configured to track the movements of the user or surroundings, so that the RTE applied to the avatar can change as the user changes. In this embodiment, allowing the RTE to be applied dynamically to a moving image and change with the image allows for a more realistic rendition of the RTE during a dynamic communication session between video chat participants.

Figure 2A:
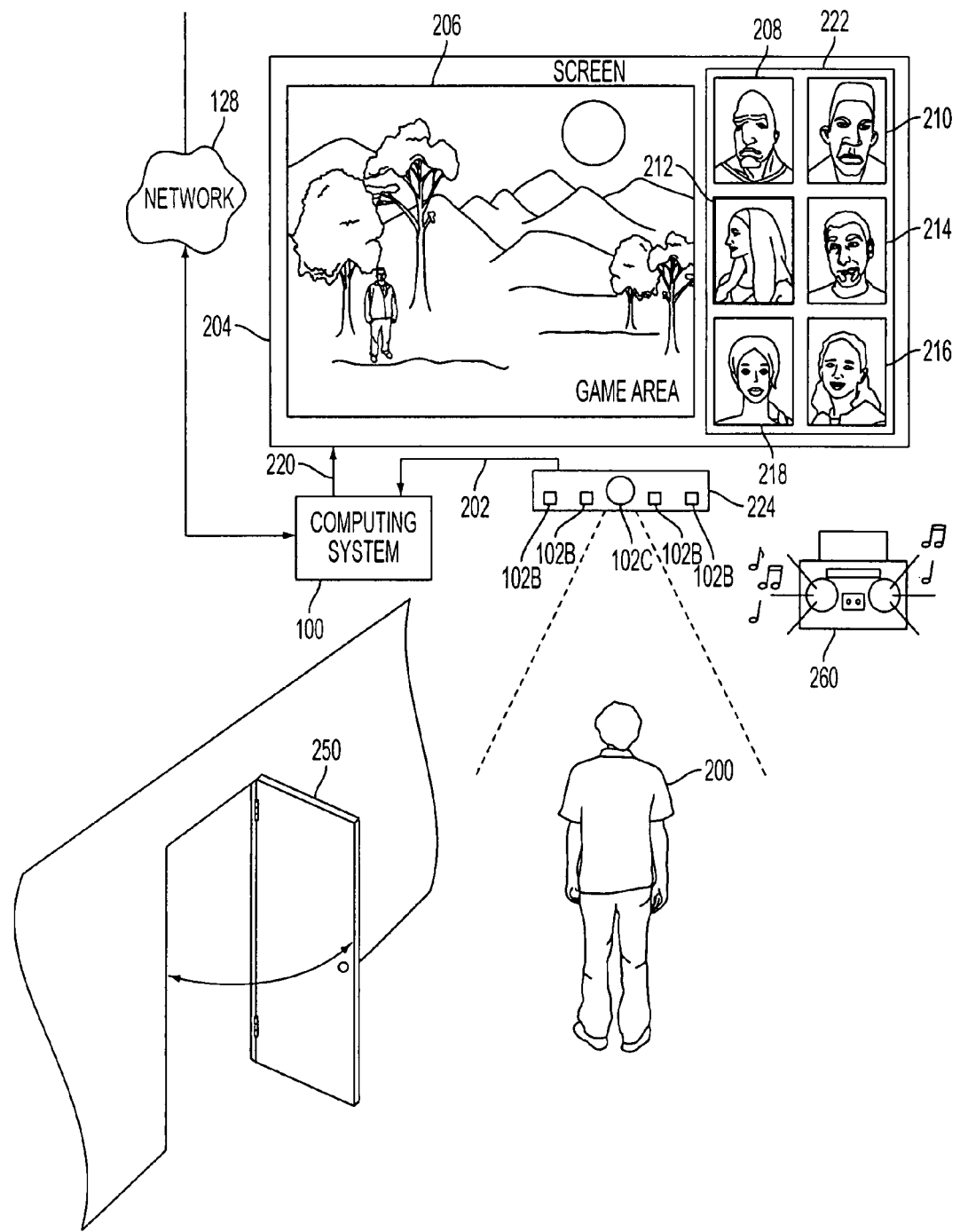
FIG. 2A is an example of a situation where the computer system 100 would be implemented in accordance with one embodiment of the present invention.

FIG. 2A is an example of a situation where the computer system 100 would be implemented in accordance with one embodiment of the present invention. The computer system 100 may receive the output from a plurality of ambient microphones 102B and a video camera 102C, housed in an AV input 224, using a connection 202. The computer system 100 can use the data from the ambient microphones 102B and the video camera 102C with a variety of other data to display an image onto a video screen 204 and output audio (no shown).

In this example the output from the computer system 100 has divided the screen 204 into a game area 206 and an avatar area 222. The avatar area 222, in this example, is displaying six different avatars 208, 210, 212, 214, 216 and 218 representative of the six people engaged in the game play displayed in the game area 206. In this situation the user 200 has a user avatar 216 displayed in the avatar area 222. Note that the avatars shown in FIG. 2A are representative of possible avatars and actual implementation can look significantly different from what is shown in FIG. 2A.

Figure 2B:
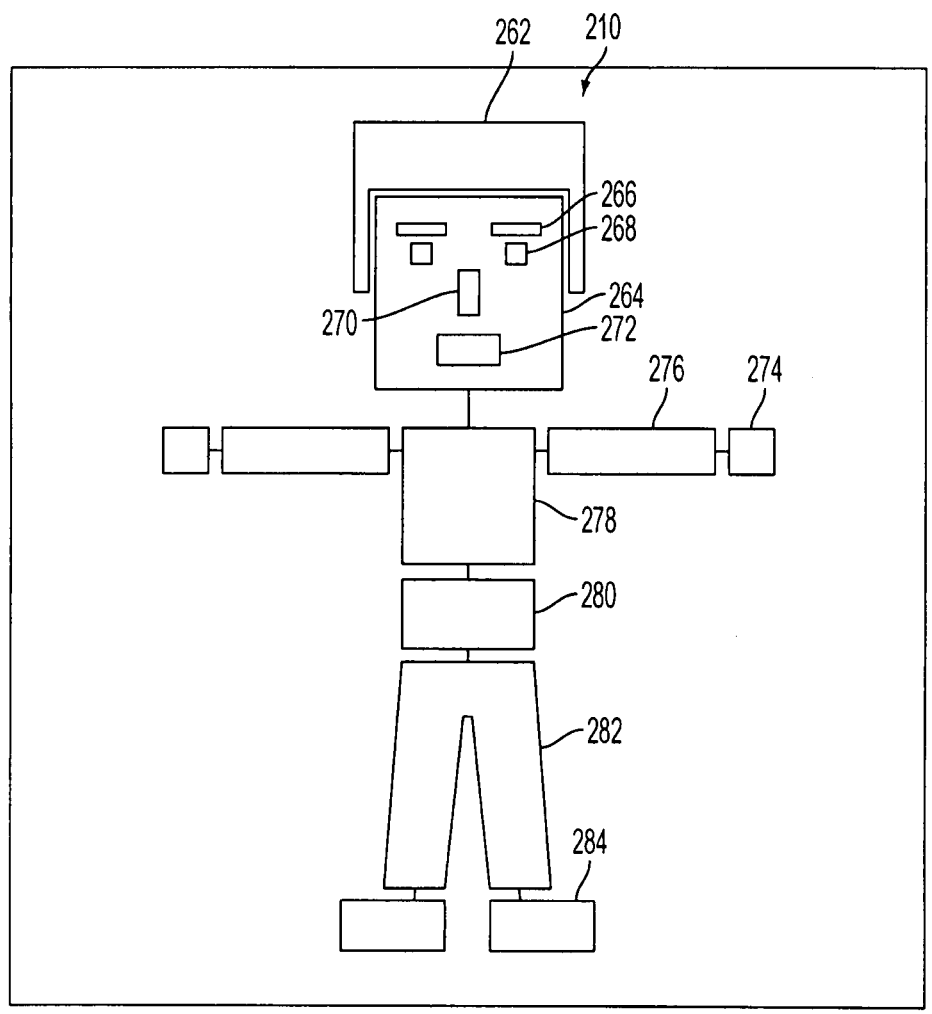
FIG. 2B is an example of a shell 210' used to create the avatar 210 in accordance with one embodiment of the present invention.
Figure 2C:
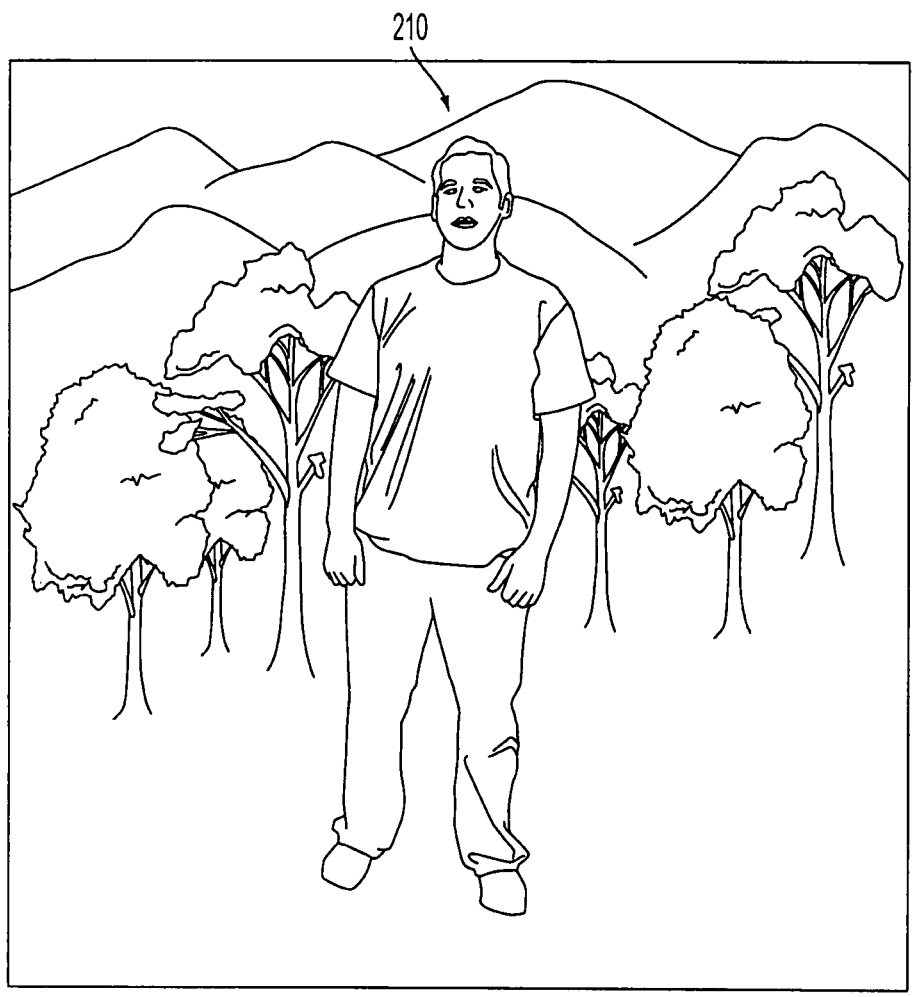
FIG. 2C is an example of a customized avatar in accordance with one embodiment of the present invention.
Figure 2D:
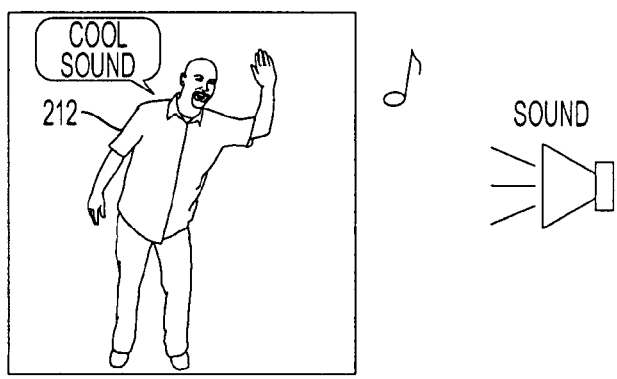
FIGS. 2D-2K illustrate avatar interaction based on real-world events, in accordance with one embodiment of the present invention.
Figure 2E:
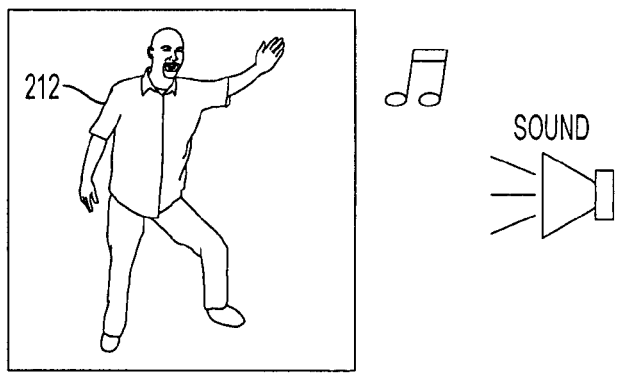
Figure 2F:
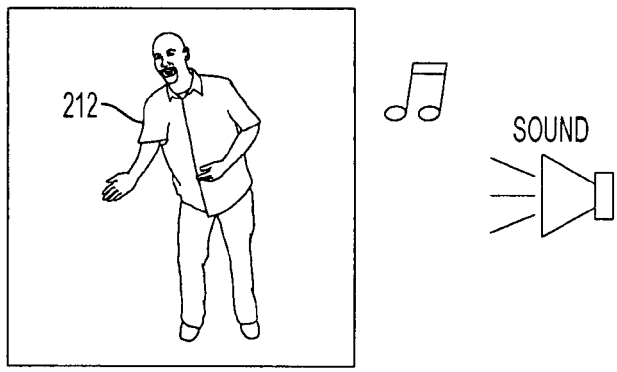
Figure 2G:
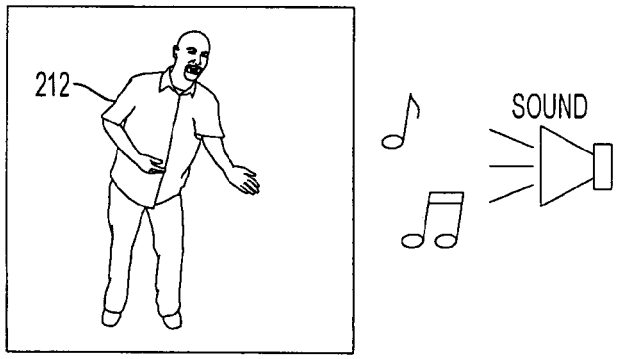
Figure 2H:
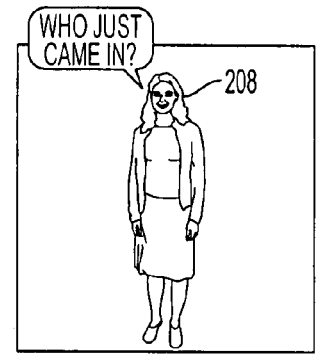
Figure 2I:
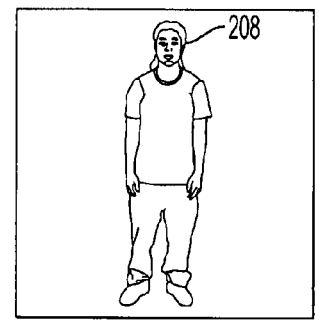
Figure 2J:
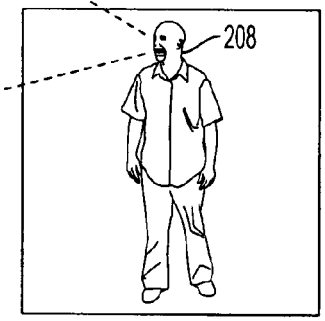
Figure 2K:
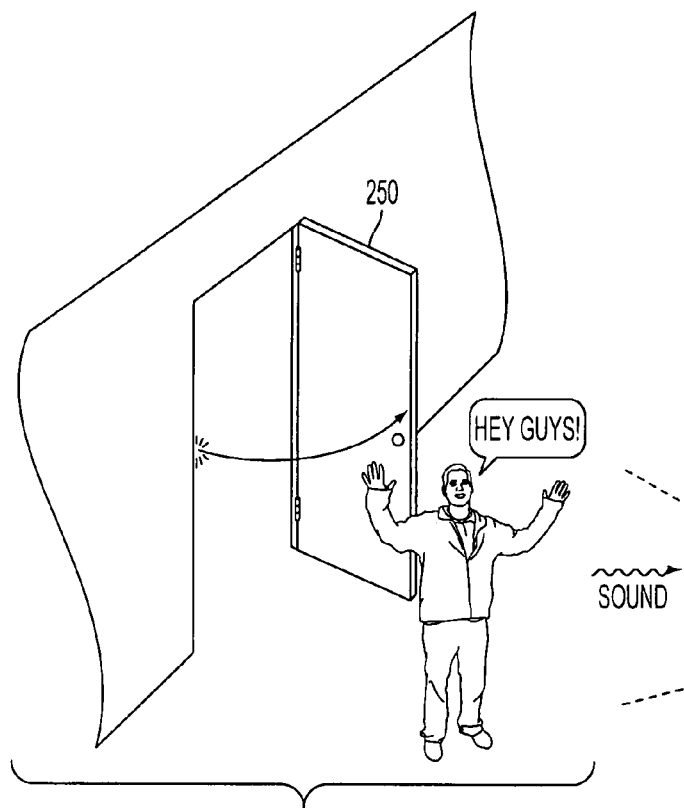

In this embodiment the users can customize and modify their avatar. FIG. 2B is an example of a shell 210' used to create the avatar 210 in accordance with one embodiment of the present invention. Customization options for one embodiment can include height, face shape 264, hair/accessories 262, eyes 268, eyebrows 266, nose 270, skin tone, clothing (based on shirts 278, sleeves 276, pants 282, and shoes 284), and environment (indicated by the cross hatching). FIG. 2C is an example of a customized avatar in accordance with one embodiment of the present invention. In this case a user has populated the shell 210' from FIG. 2B resulting in the avatar 210. The previous list of customizations is not complete and is meant to convey that a user's avatar can be customized to closely match the user the avatar is meant to represent. Other customizations not listed that help an avatar resemble the user are within the scope of this disclosure.

However, users can choose to make their avatar not representative of their physical self and instead be more playful when selecting their avatar. To this end, programmers can provide preset avatar themes that reflect different characteristics a user can express. Examples of preset avatar themes include a grumpy old man, ditzy cheerleader, tough action hero, geeky scientist, stoner wastoid, gangsta rapper, and a redneck. The examples for preset avatar themes are not inclusive and are provided as a guide to possible themes and not meant to be restrictive.

The ability for the user's customized avatars to respond to external real world stimuli can be a function of the ambient microphones 102B and the video camera 102 connected to the computer system 100 in addition to other possible input devices. In one embodiment the ambient microphones 102B and the video camera 102 are integrated into one unit shown as the AV input 224. The ambient microphones 102B are composed of an array of unidirectional microphones designed to pick up sounds from an environment associated with a user where the computer system 100 is located. This feature may be linked to the sound capture ability of the computer system 100 that is able to identify and recognize various sounds. For example, in one embodiment, the computer system 100 can recognize the sound of a door 250 opening and/or or the sound of real world music 260 playing in the background.

In one embodiment, the ambient microphones 102B help the computer system 100 locate the area in the room where the sound is emanating giving the avatars for the remote players the option to turn their heads in the direction of the real world sound. Furthermore, depending on the type of sound identified and the chosen preset avatar theme the reaction of the avatars can be different. For example, as shown in FIGS. 2D-2G if the ambient microphones 102B detect music in the background environment an avatar might automatically start dancing in beat with the rhythm of the real world music 260. It is also possible that another avatar would automatically become agitated by the same music and speech balloons filled with "Turn down the music!" would appear over the avatar's head. The word balloons above that avatar could grow larger and the avatar more agitated the louder the real world music 260 is played. Alternatively, the avatars could be given prerecorded voices and actually "speak" in response to specific real world stimuli. In the previous example an avatar could actually say, "Turn down the music!" if background music is detected. In another example, shown in FIGS. 2H-2K a male opens the door 250 and walks into the room where the system 100 is located and the various avatars could look toward the door or ask "Who just came in?" Upon the computer system 100 receiving the speech "Hey guys!" the computer system 100 is able to recognize the voice as male and any female avatars could respond with catcalls and whistling in the direction the male voice.

Beyond automated response from the avatar based on a user-selected theme the users could control the avatar in real time using voice commands inputted through a microphone or using the controller. The user 200 could change any of the adjustable characteristics of their avatar including the avatar theme. The ability to manually modify the avatar in real time would give users the option of changing their avatar as often as people change their moods. Users could also manually control specific aspect of the avatar. For example, if a user wanted their avatar to have a specific facial expression commands issued through the controller or special voice commands would initiate a particular facial expression. A user could also initiate Real-Time Effects (RTE) that would be imposed on, or incorporated into, their avatar. For example a user could light the hair of their avatar on fire or make the eyes of their avatar glow red.

Figure 3:
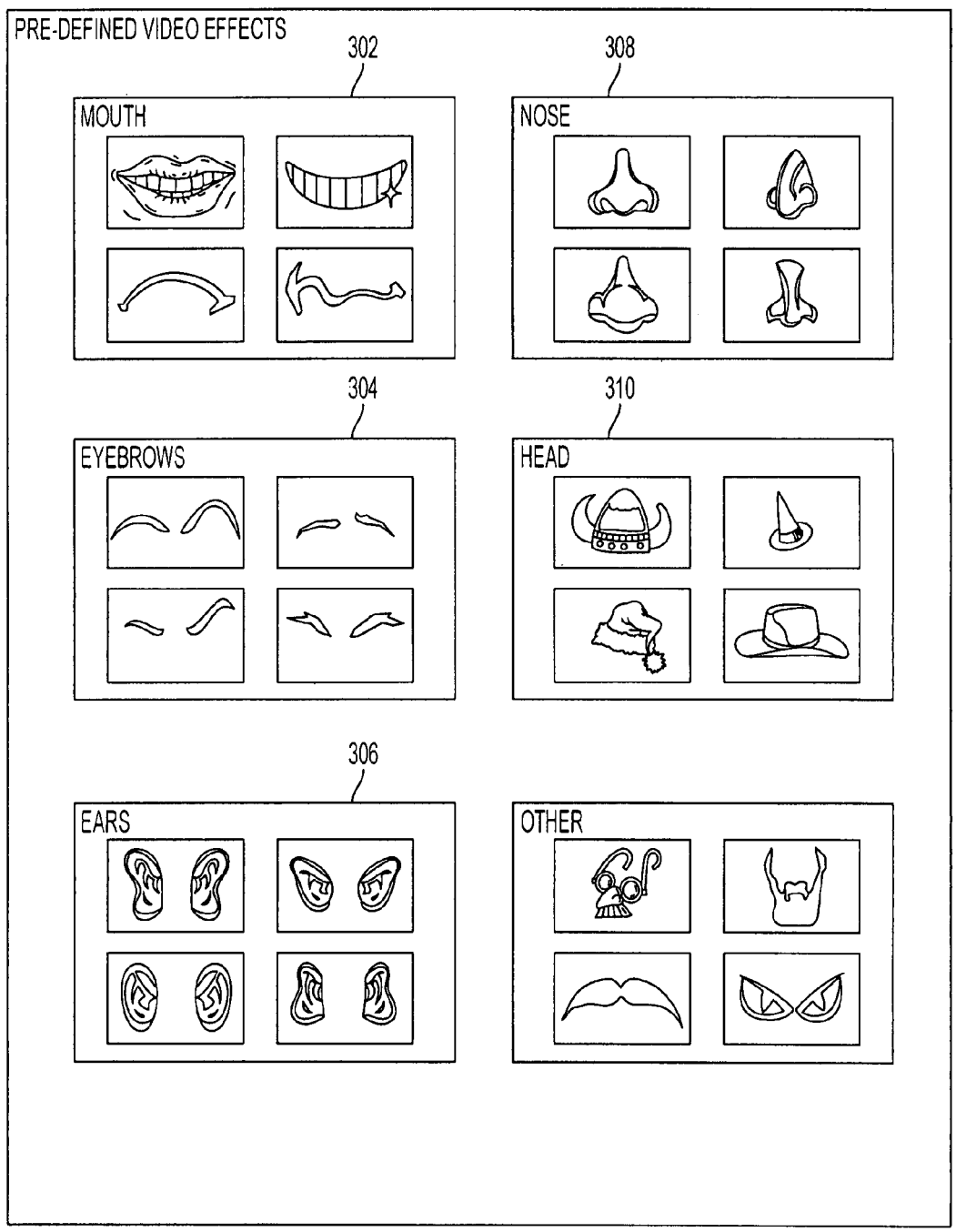
FIG. 3 shows example groups of the predefined video effects library 108A in accordance with one embodiment of the present invention.
Figure 4:
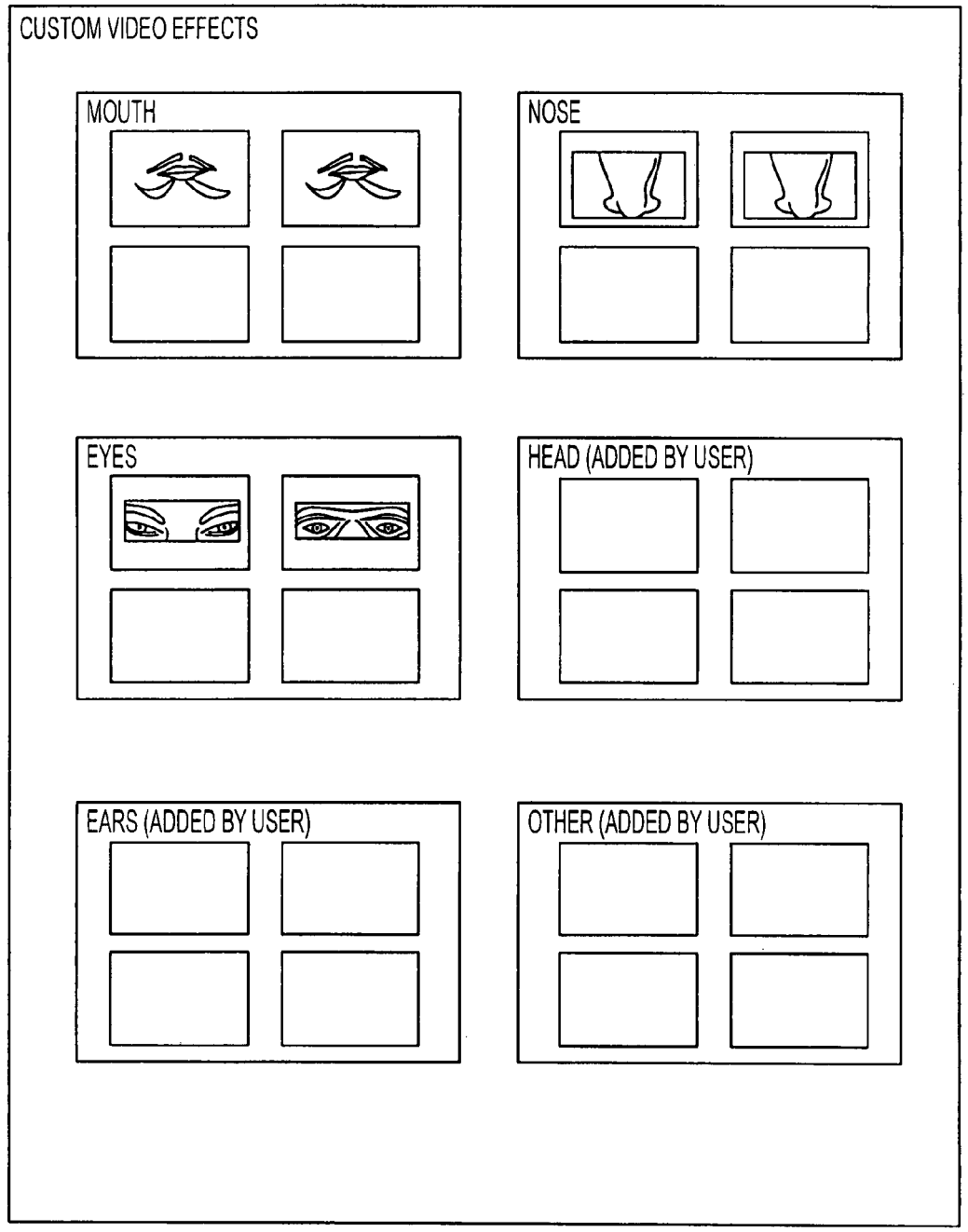
FIG. 4 shows the partial contents of the custom video effects library 108B in accordance with one embodiment of the present invention.

FIG. 3 shows example groups of the predefined video effects library 108A in accordance with one embodiment of the present invention. Though the graphics in FIG. 4 are static, the present invention deals with animated graphics to create substantially real time video effects. The effects are substantially real time because there is a slight delay in the application of the effect due to the complex, but rapid, calculations necessary to apply the RTE. However, the end result is a video effect that appears to be substantially presented in real time during the video communication. In one embodiment, a combination of the video camera 102C and the system 100 captures real-time video of a user and processes the real-time video to identify a user's real-world facial expression. In one embodiment, the video camera 102C captures image frames and digitizes the image frames to define a pixel map. The pixel map of the real-world facial expression is analyzed to locate the eyes of the user and subsequently determine the users facial expression. Subsequent sampling of the user's facial expression can be compared to previous sampling to detect real-time changes to a user facial expression. The user's can be periodically updated to substantially reflect the real-time facial expression of the user.

In another embodiment when an RTE is applied to the avatar the video camera 102C may follow the movement of the user animating the avatar to mimic the user's motions. The pre-defined video effects 108A are video effects that may be loaded onto the computer system 100 by the system manufacturer, as part of software processed by the computer system 100 or downloaded over the network 128. Regardless of how the pre-defined video effects 108A are loaded on the computer system 100 it is possible that they will be common among all users of systems capable of interfacing with the computer system 100.

For example, a predefined video effect for the mouth area of an avatar could include smiles, frowns, puckers and grimaces as shown in mouth group 302. Predefined video effects for the eyebrow area of an avatar could include various eyebrow animations including scowls and a variety of animations to express emotions of surprise or doubt as shown in eyebrow group 304. Applying dangling earrings or making pointy elf like ears are effects that could be applied to the ear areas of an avatar. While morphing a clown nose or extending the nose "Pinocchio style" to infer lying could be applied to the nose of an avatar. Additionally, adding horns to or a variety of hats and halos to the head of an avatar is also possible. More examples of RTE not shown in FIG. 4A are effects applied to the eyes of an avatar such as making their eyes glow red, or pop out of their head or an exaggerated rolling of their eyeballs. Additionally, RTE can be applied to the arms, legs, feet and even the area surrounding an avatar.

In another embodiment there are pre-defined RTE that enable a user to apply an entire theme to their avatar or a remote users avatar. For example, the groups defined in FIG. 3 would be completely different and include categories such as girls themes, baby themes, animal themes and celebration themes. Possible girls themes include a RTE where an avatar is suddenly dressed in a "Little Bo Peep" outfit and standing in a field with sheep. Under baby themes there could be a selection where an avatar is shown with a pacifier in its mouth wearing a diaper with a crib in the background accompanied by the sound of a baby crying. With the animal theme an avatar could be morphed into a jackass. Additionally, under celebrations, an avatar could have a party hat on top of its head, confetti and tickertape falling from the sky and the sound of cheers in the background. The pre-defined video effects shown in FIG. 3 and the examples listed are not inclusive of all of the potential effects. One skilled in the art should recognize that the potential for effects is unlimited and only constrained by a programmer's imagination and moral fiber.

FIG. 4 shows the partial contents of the custom video effects library 108B in accordance with one embodiment of the present invention. The custom video effects 108B are unique to one particular user and are created or customized by the user. The user can create custom video effects by creating or editing avatar animations to their liking. Examples of what users could create or modify include animations of an avatar sticking its tongue out or an animation depicting an avatar vomiting. The user could also create animations of an avatar smiling and replacing its teeth with fangs or revealing that some teeth are missing. It would also be possible to sell or license custom video effect using a model similar to mobile phone ringtones. For example a user would be able to visit a website or custom video effect portal where they would be able to download custom video effects after paying a license or sales fee. The examples listed are intended to be possible custom effects and are not intended to be restrictive.

FIGS. 5A-5F provide an example of how a user would apply a RTE to the avatar of a remote user in accordance with one embodiment of the present invention. In this embodiment the user 504 whose screen name (m3rCy Flu5]-[) is displayed under his avatar 502 will apply a RTE to a target user 508 whose screen name (Marks) is displayed under his avatar 506. FIGS. 5A-5F show the avatars as still images but as discussed above the avatars will be moving and interacting with the users. It should also be noted there could be more users involved as shown in the avatar area 222 in FIG. 2.

In this embodiment the user 504 would initiate the application of a RTE by selecting which user's avatar the RTE will be applied to, in this case, the target user 508. The controller buttons associated with symbols 510 allow the user 504 to scroll through available users because, as discussed above, it is possible for multiple users to be connected with user 504 using the network 128. The user 504 selects the target user 508 by pressing the L1 button on his controller at which point the user 504 will see the example RTE categories 512 shown in FIG. 5B. In this example the user 504 selects a video RTE by pressing L1. After selecting the video RTE the user 504 is allowed to choose from the options shown in FIG. 5C. As previously mentioned, the computer system 100 can apply RTE to more than the face of an avatar but this example is dealing with applying a RTE to the face of the target user's avatar 506.

The user 504 can scroll through more possible video effects by pressing the controller buttons corresponding to the symbols 510. Having selected to apply a RTE to the eyebrows of the target user's avatar 506 brings user 504 to the choices shown in FIG. 5D. At this point the user 504 selects the set of eyebrows he wants to apply to the target user's avatar 506. The user 504 can select from any of the eyebrows available in the predefined video effects 108A or his custom video effects 108B by scrolling through the possible selections. The computer system 100 can indicate which of the possible selections are from the custom video effects 108B of the user 504 by using different icons, colors, animations or fonts or any combination thereof.

Figure 5A:
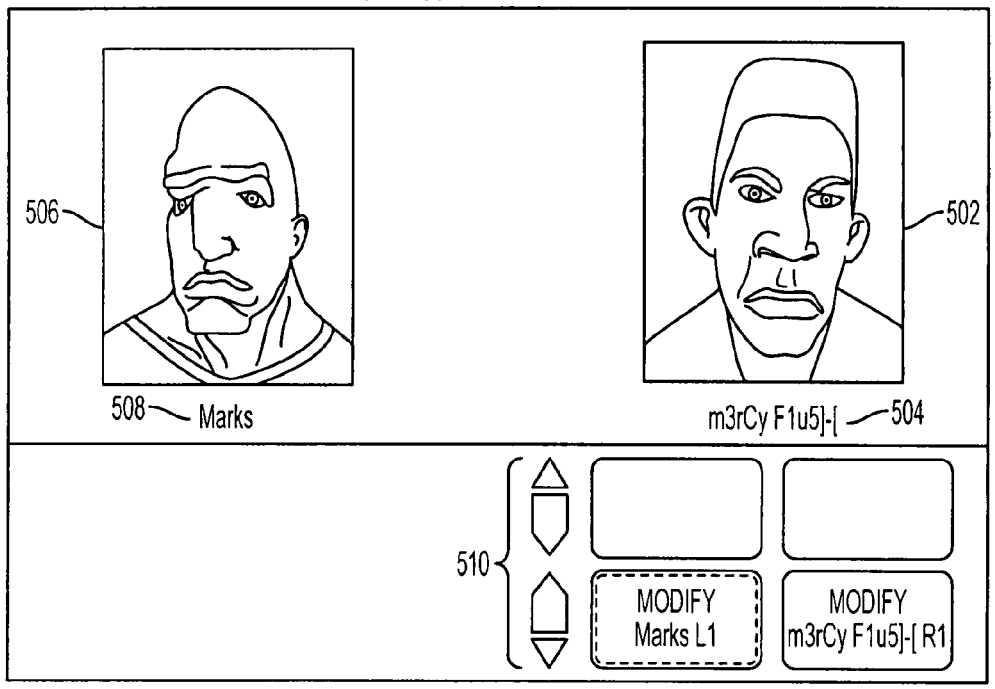
FIGS. 5A-5F provide an example of how a user would apply a RTE to the avatar of a remote user in accordance with one embodiment of the present invention.
Figure 5B:
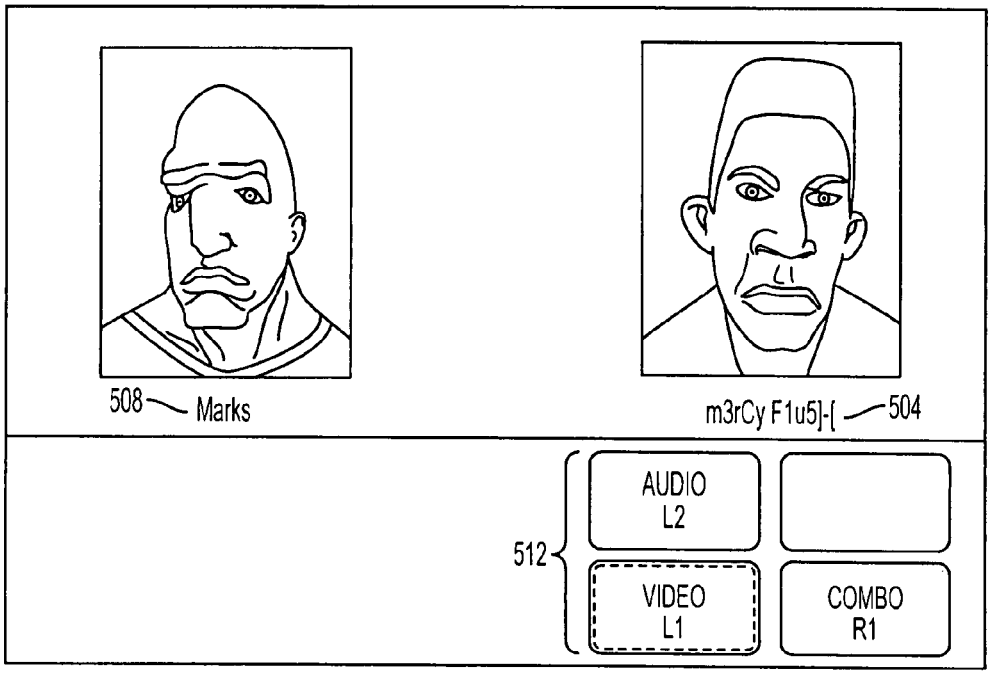
Figure 5C:
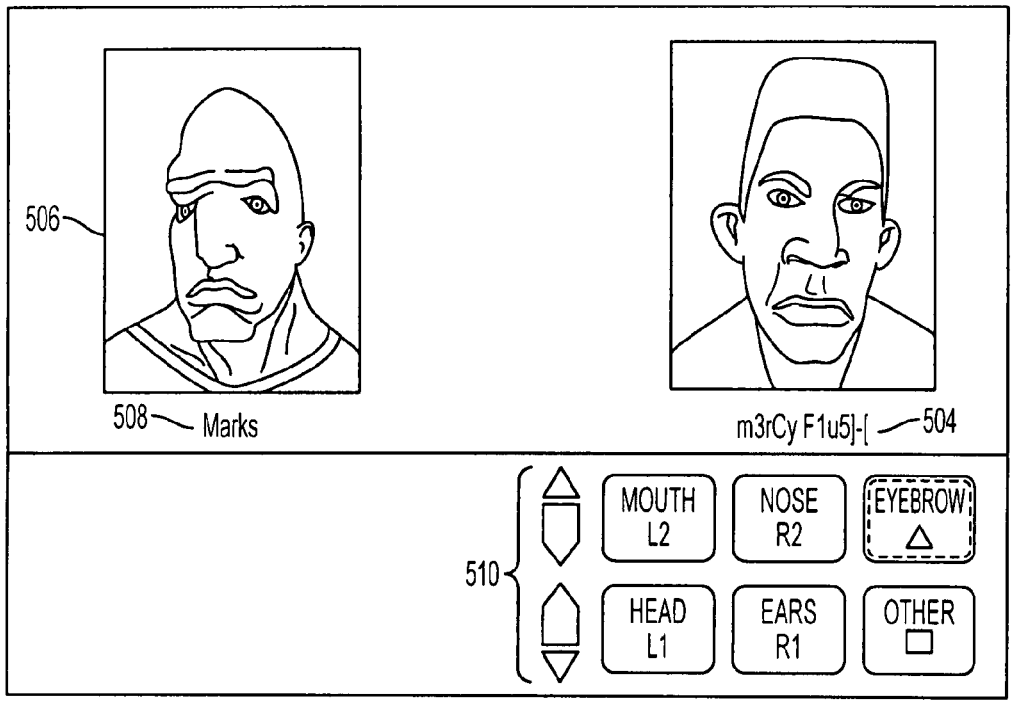
Figure 5D:
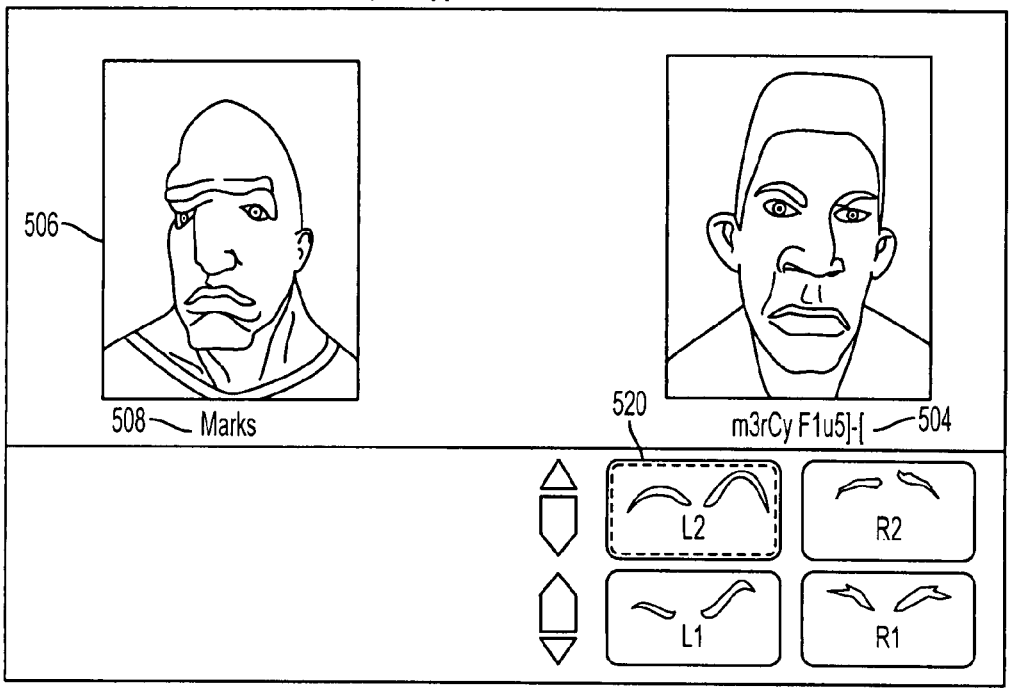
Figure 5E:
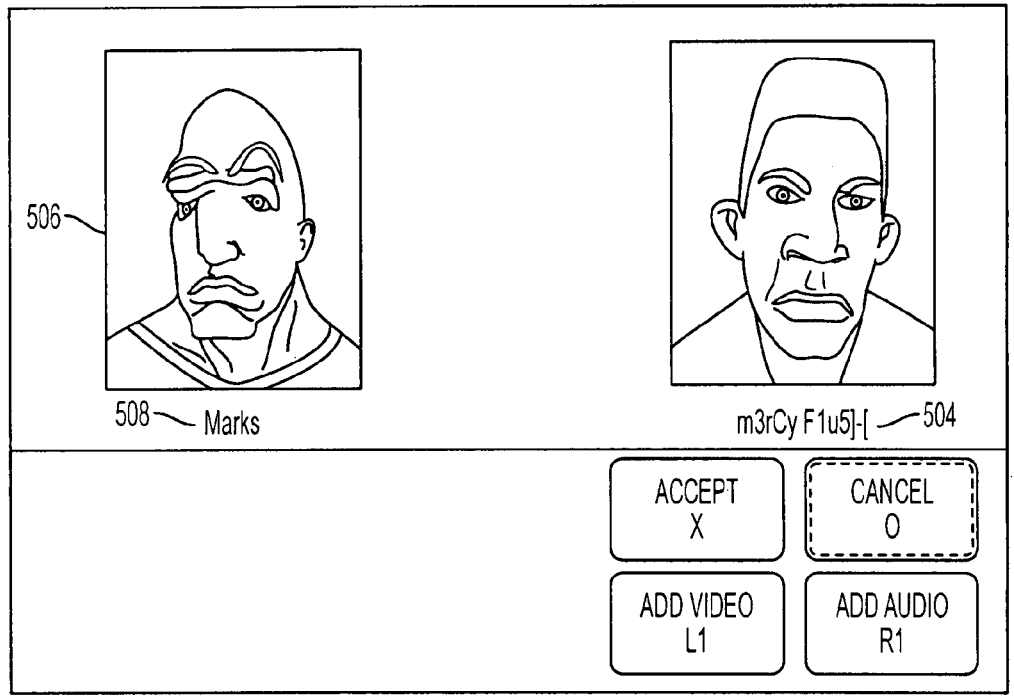
Figure 5F:
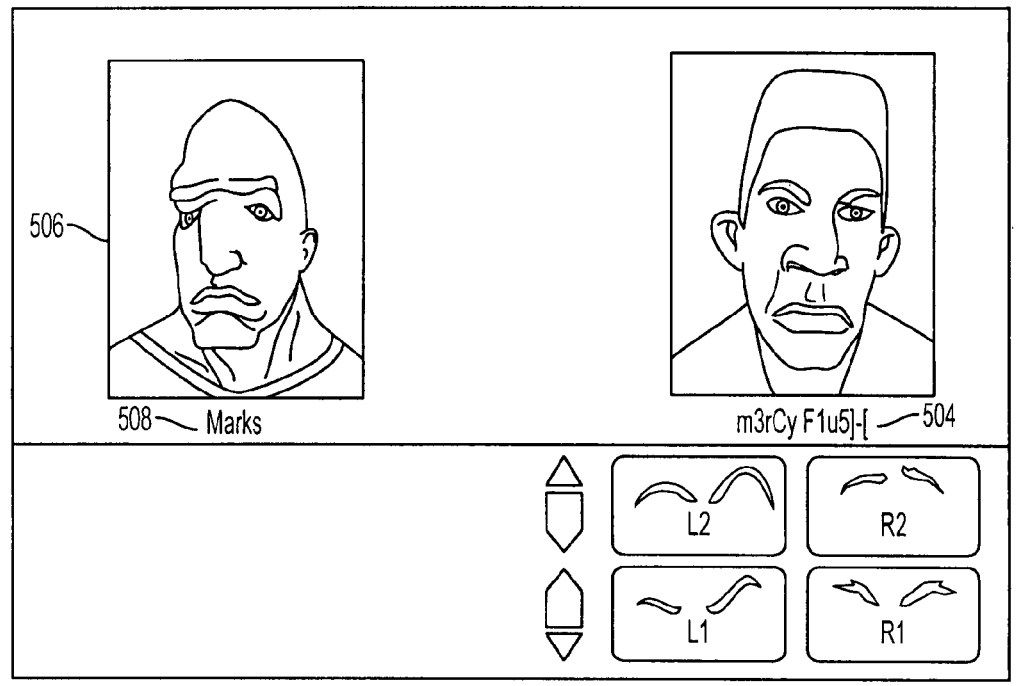

Continuing with this example the user 504 applies eyebrows 520 by pressing L2 which results in the graphic shown in FIG. 5E. In this example the eyebrows 520 are shown on the avatar from the target user 508 as a preview since the user 504 still has the option to accept or cancel the application of the RTE. In a different embodiment there is a separate preview window that would allow the user 504 to see the target user's avatar 508 with the applied RTE. This would maintain one window where there is an unaltered avatar from the target user 508. In FIG. 5F, the user 504 has canceled the application of the eyebrow RTE to the avatar of target user 508 and has returned to the previous menu where he can select different eyebrows from the video effects library.

Returning to FIG. 5E, note that the user 504 has the option to add more effects. In particular, the user 504 can press L1 to add video or press R1 to add audio. This feature allows the user 504 to add multiple RTE and preview the effects before sending them to the remote users. In another embodiment, specific buttons on a controller or specific voice commands can be used to dynamically apply a predetermined RTE. For example, the user can program a button to always apply horns over another user's avatar. This feature could be considered a "hot button" that can be quickly pressed so the RTE immediately shows up, without having to navigate through multiple selection screens. Once a hot button is programmed, it may be reprogrammed on demand. While this embodiment has used the controller buttons shown in 5A-5F, other embodiments can be manipulated using controllers responsive to motion and relative positional movement, the controllers capable of transmitting signals via a wired or wireless link.

Figure 6A:
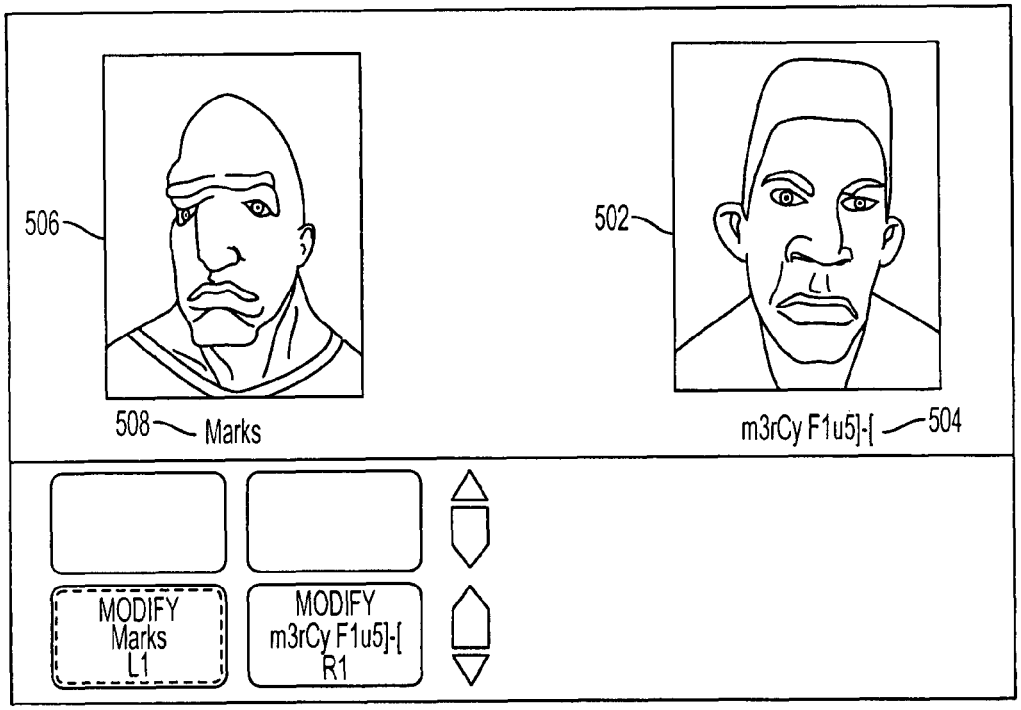
FIGS. 6A-6D illustrate how a user 508 can apply a RTE to his own avatar in order to emphasize an emotion in accordance with one embodiment of the present invention.
Figure 6B:
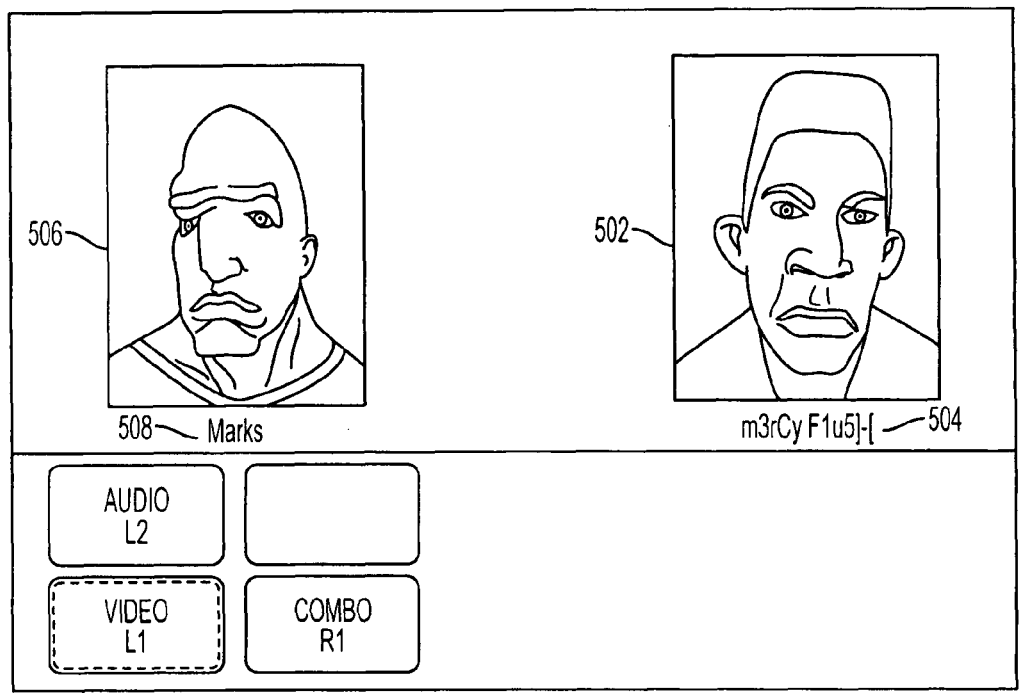
Figure 6C:
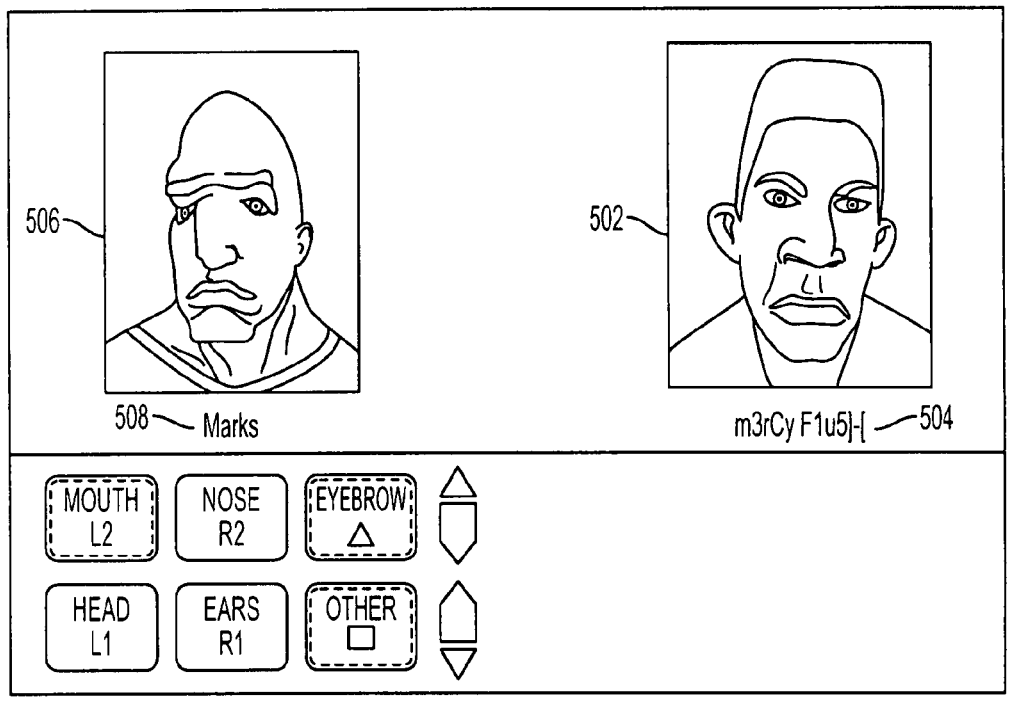
Figure 6D:
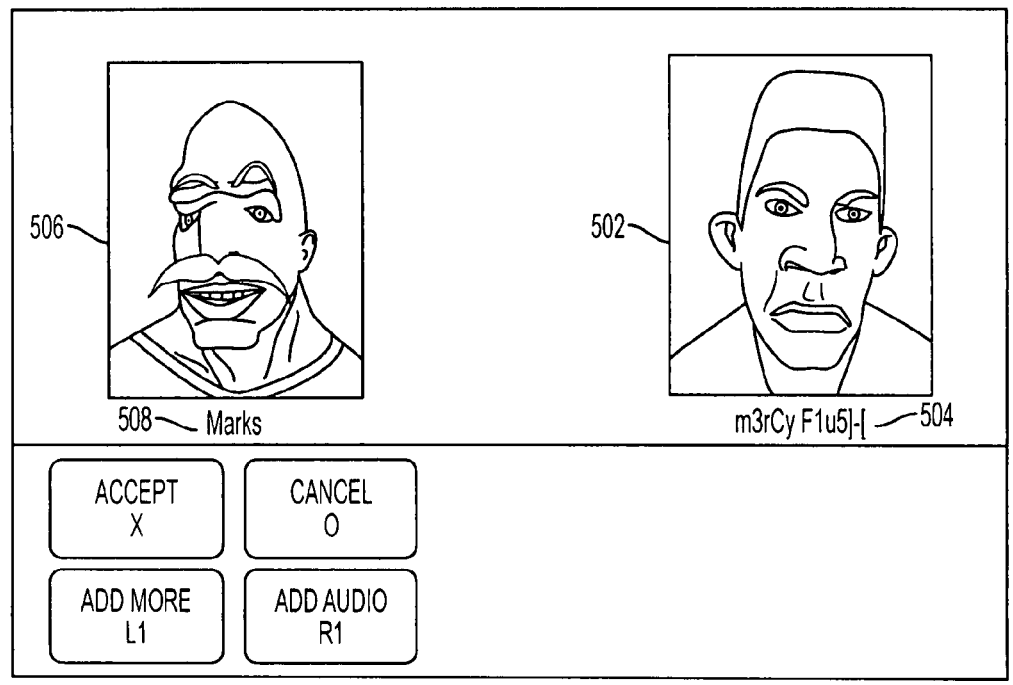

FIGS. 6A-6D illustrate how a user 508 can apply a RTE to his own avatar in order to emphasize an emotion in accordance with one embodiment of the present invention. FIG. 6A shows that the user 508 (Marks) is conducting a video chat with user 504 (m3rCy Flu7]-[. To apply a RTE to his own avatar the user 508 presses L1 that takes us to FIG. 6B. Having already discussed examples of how an RTE may be selected, FIG. 6C summarizes the areas of the user's 508 face that may receive an applied RTE. In FIG. 6C the user 508 selects to apply RTE resulting in modified eyebrows, mouth and a mustache as shown in a preview mode in FIG. 6D. As discussed above, in another embodiment the preview can be shown in a different window so as to no obscure or detract. In one embodiment the video RTE will remain for a predetermined period of time. In another embodiment the video RTE will stay in place following the movements of the avatar until the initiator or the RTE cancels the RTE.

Figure 7C:
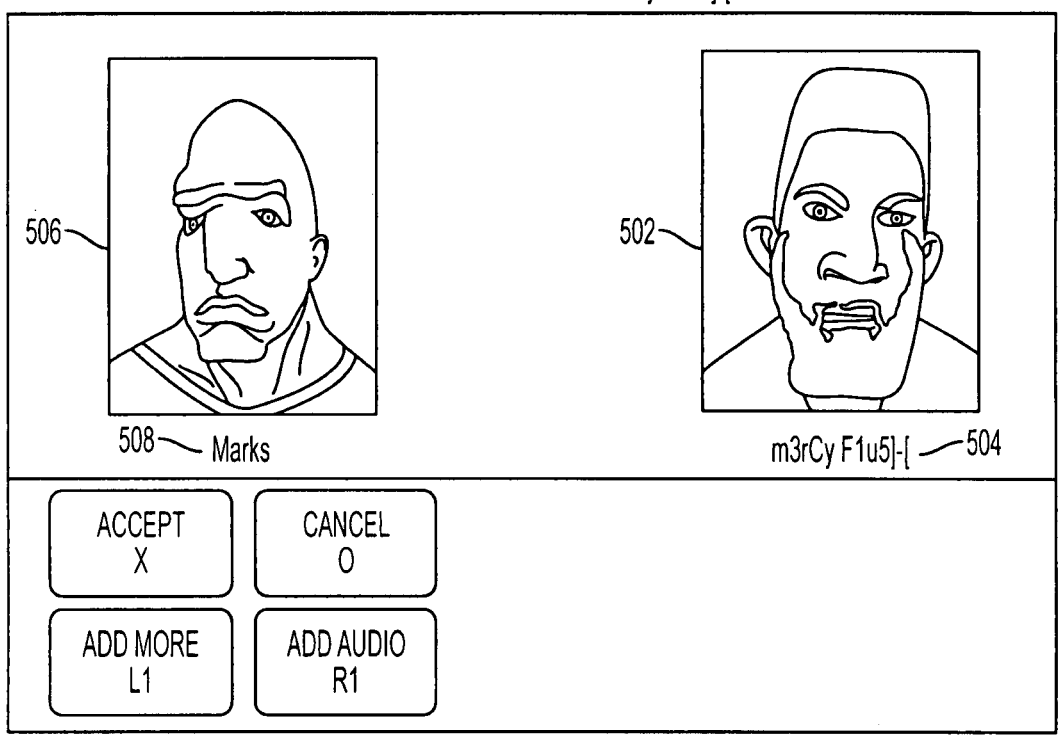

FIGS. 7A-7C show how a user 508 (Marks) can apply a RTE to the avatar of the user 504 (m3rCy Flus]-[) in accordance with one embodiment of the present invention. FIG. 7A is where the user 508 selects to apply a RTE to the user 504. The intermediate steps having already been discussed, FIG. 7B jumps ahead and shows the user 508 selecting to apply a beard to the avatar of the user 504. If the user 508 accepts the RTE by pressing the corresponding button on his controller the user 504 will have the RTE applied to his avatar. All participants in the video chat will see the avatar for the user 504 with the RTE applied. Because the video RTE was applied by the user 508 to the user 504 the duration of the video RTE will only be for a predetermined period of time. In another embodiment the video RTE would stay in place until the sender, the user 508, sends a command canceling the RTE.

In another embodiment RTE will not be visible to all participants because a user can choose to not allow RTE to be applied to their avatar because of the potentially offensive nature of RTE. Furthermore, pre-defined RTE can be assigned maturity ratings similar to movie ratings from the Motion Picture Association of America or the video game ratings conducted by the Entertainment Software Rating Board. This would allow the computer system 100 to filter incoming RTE to ensure that only pre-defined RTE within a specific rating are displayed. This feature would assist parents in making sure their children are not exposed to potentially offensive RTE.

To clarify the application of custom video effects assume the user 508 selected a custom RTE from FIG. 7B. In order for the custom video effects of the user 508 to be displayed on the screen of the user 504 the effect will need to be transmitted across the network 128. Once transmitted, the custom video effect can be cached in the system of the user 504 but the user 504 will not be able to voluntarily use the custom video effect. In another embodiment if the system the user 504 is using has been configured to reject custom RTE the RTE sent from the user 508 will not be displayed to the user 504.

While the discussion of the RTE performed by the computer system 100 has been primarily devoted to video processing the computer system 100 is also capable of performing RTE on audio input. FIGS. 4A and 4B show predefined and custom video libraries but they could also be shown as a predefined and custom audio library. Just like their video counterparts, the effects from the audio libraries can be triggered by a user or automatically by the computer system. Similarly, the audio effect will be substantially real time because of the delay required to process the effect and the transmission delay across the network 128.

The audio RTE would be initiated in the same manner as the video RTE as shown in FIGS. 5A-5F except applying audio RTE instead of video RTE. For example, when choosing the RTE the user applying the effect would hear a short preview that the other users could not hear. The duration of the audio RTE would also be configurable ranging from automatically stopping the RTE after a few seconds to waiting for a user to cancel the effect.

Examples of possible audio RTE include shifting the pitch of a users voice up or down, and adding echo and reverberation. Modifications to a user's voice are not the only application of audio RTE. Pre-recorded sounds, similar to what disc jockeys use during radio broadcasts, would be available for users to initiate or automatically added by the computer system 100. The combination of audio and video RTE applied to user avatars will make the communications experience using computer system 100 much richer, engaging and interactive than other forms of communications.

Figure 8:
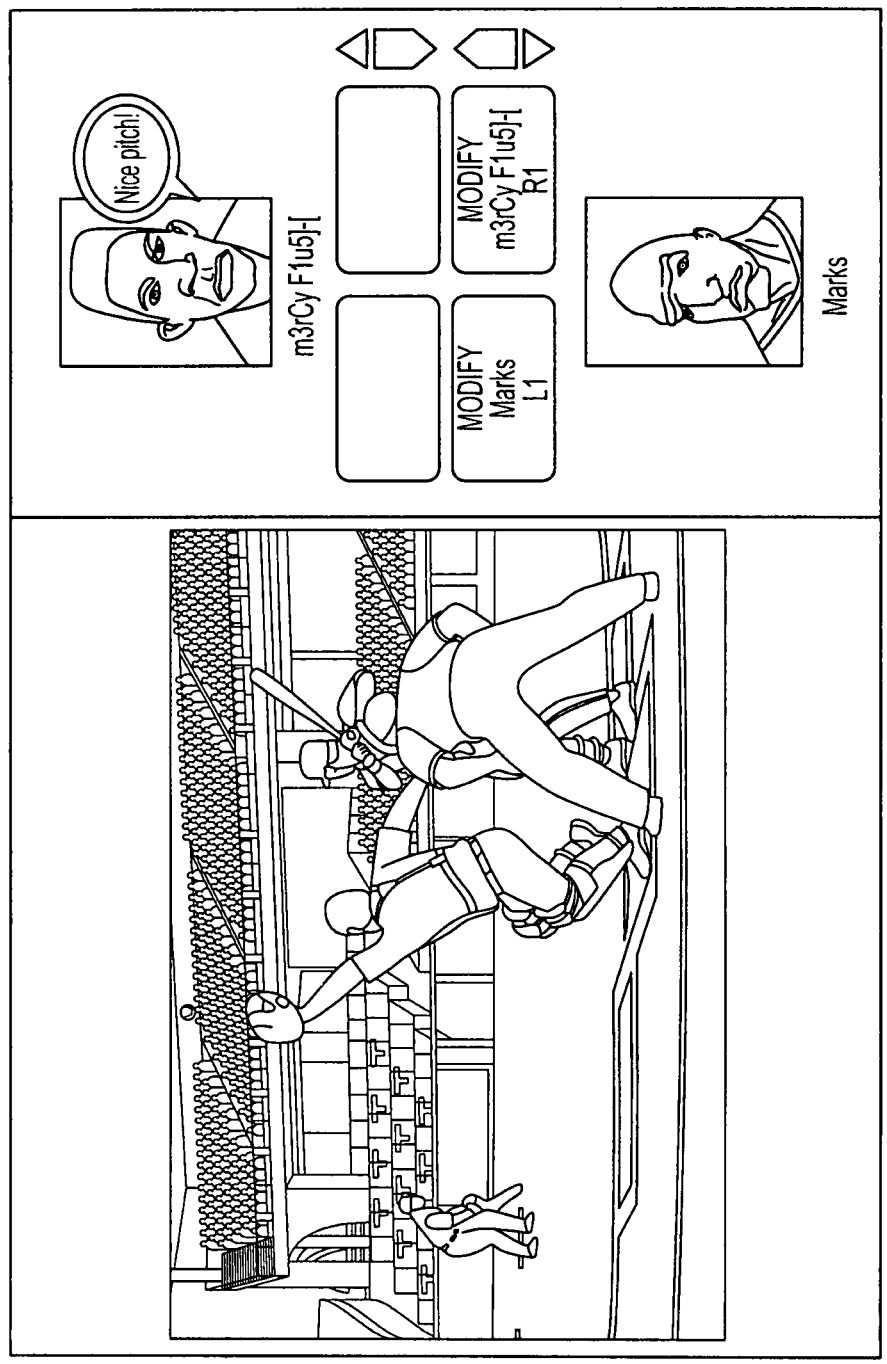
FIG. 8 shows how the avatars with RTE could be implemented with online games in accordance with one embodiment of the present invention.

FIG. 8 shows how the avatars with RTE could be implemented with online games in accordance with one embodiment of the present invention. User initiation of the RTE can be accomplished using the controller or by voice command. This embodiment shows the two users off to the side of the game being played, however their avatars could be placed over the game screen 902 in order to maximize game viewing area of a display. In this embodiment the RTE can be initiated by either any of the users or automatically by the system depending on the software being processed. Automatic initiation of the RTE by the computer system would be triggered by specific events occurring. For example, if the computer system 100 was running a baseball simulation and one user hits a grand slam the avatar for the batters team could have an RTE applied where there eye are morphed into animated dollar signs and the audio RTE would play a cash register "cha-ching" sound in the background. Conversely, the avatar for the pitchers team could have animated tears placed on their avatar and the sound of a baby crying in the background.

Figure 9:
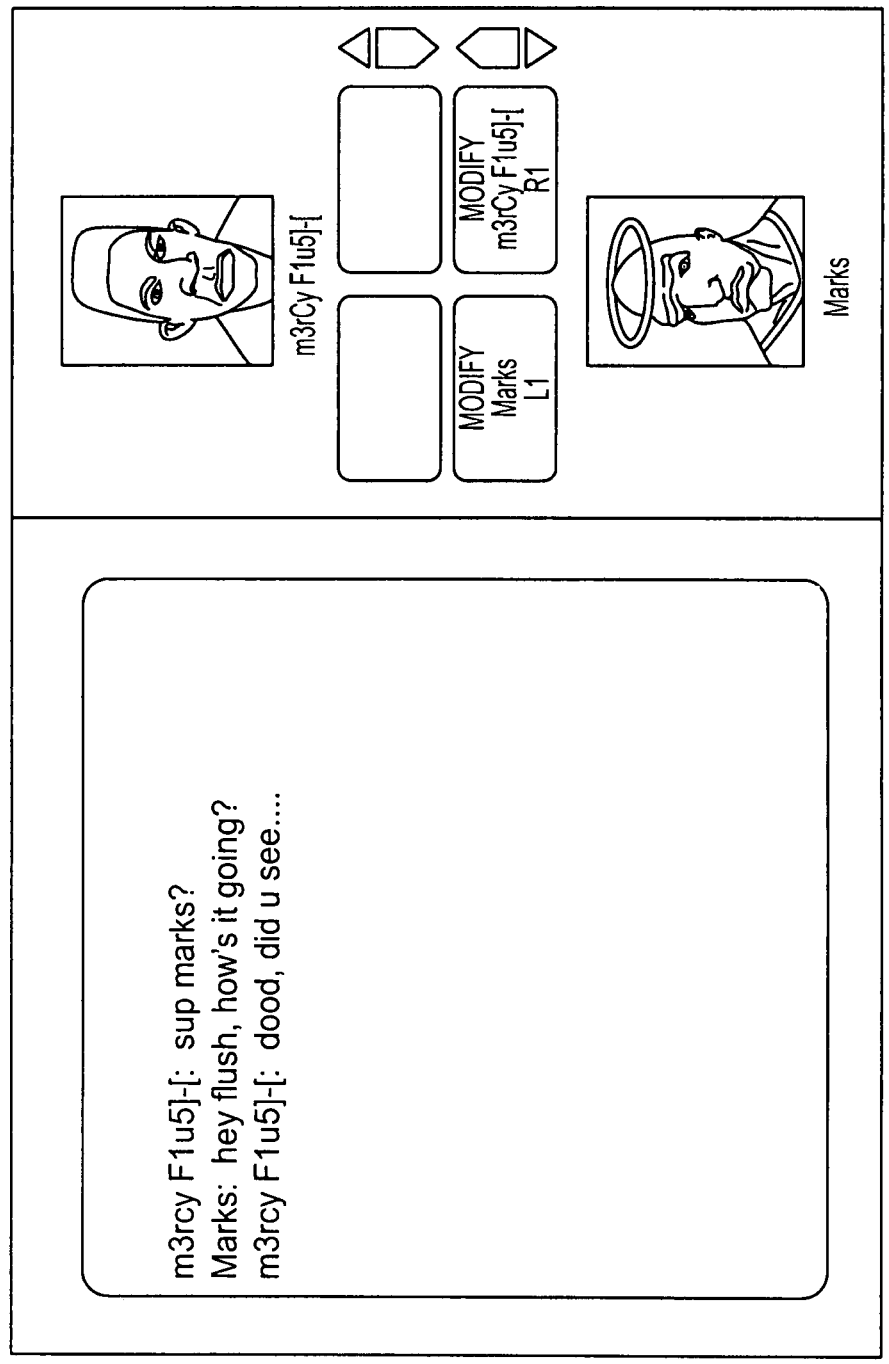
FIG. 9 demonstrate how the video chat could compliment an online text/voice chat application (e.g., like instant messaging "IM") in accordance with one embodiment of the present invention.

FIG. 9 demonstrate how the video chat could compliment an online text/voice chat application (e.g., like instant messaging "IM") in accordance with one embodiment of the present invention. This application would be a step forward from current instant messaging and video messaging because of the ability to apply RTE to both the avatars and audio from other users. The benefit of this application is that it would allow people who have lost their voice the ability to communicate using an instant messenger typing system while expressively communicating their emotions using the animated avatars with RTE. The application could also be used to convert voice chat into text chat or even output Braille to assist the hearing and sight impaired.

Figure 10:
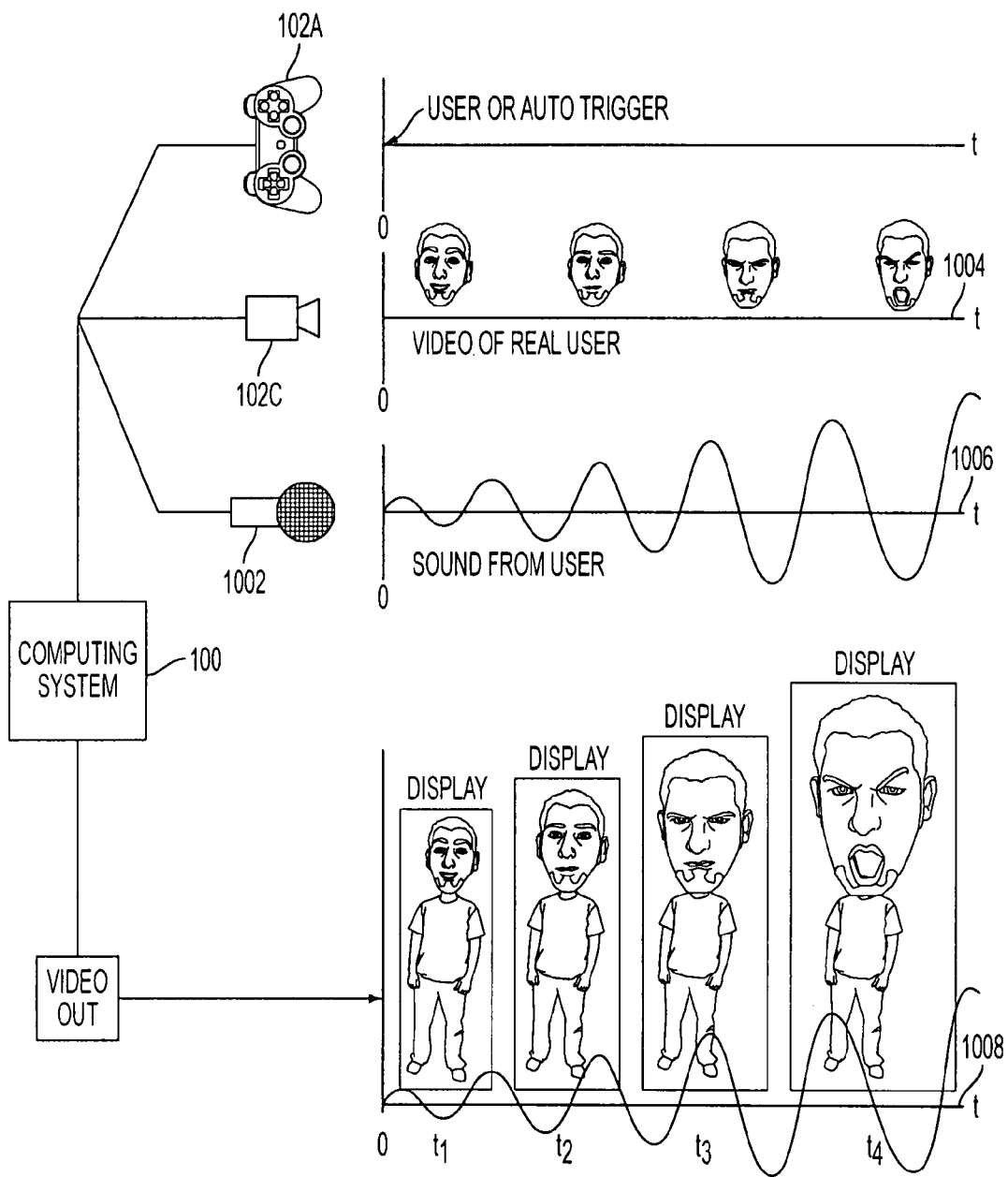
FIG. 10 shows how the RTE augments the avatar and audio output based on feedback from the user after the RTE is triggered in accordance with one embodiment of the present invention.

FIG. 10 shows how the RTE augments the avatar and audio output based on feedback from the user after the RTE is triggered in accordance with one embodiment of the present invention. System 100 uses the microphones 102B or 102D, a video camera 102C and a controller 102A attached. An RTE is triggered at time zero either automatically or by the user. Once the RTE is triggered the system 100 begins processing the effect and begins receiving feedback from the video camera 102C and the microphones 102B or 102D regarding the user's facial expression and vocal characteristics. Changes in the user's vocal characteristics can be detected by using the microphones 102B/D to capture an initial vocal characteristic. Subsequently, a second vocal characteristic is captured and compared to the initial vocal characteristic. The two vocal characteristics can be compared to detect a change in a user's vocal characteristic. For example, at time 1, the video camera and microphone receive the image and vocal characteristic shown at time 1 on their respective graphs 1004 and graph 1006. The RTE are processed and outputs the avatar and sound shown in graph 1008. Progressing to time 2, the user continues to speak, but as seen at time 2 on the graph 1006 the user is speaking louder than at time 1. Accordingly, the RTE modifies the output image making the avatars head slightly larger and opening the avatars mouth slightly wider.

At time 3, the user continues to speak but louder than at time 2 as shown in the graph 1006. Additionally, the user has furrowed his brow and opened his mouth wider as shown in the graph 1004. The RTE receives this feedback and further increases the size of the avatars head, makes the avatars eyebrows bushier and opens the avatars mouth even more. At this point an audio RTE could be implemented such as making the user's voice deeper and more menacing or conversely, gradually increasing in pitch. At time 4, the user has continued to become louder than at time 3 as indicated by the intensity on the graph 1006. The mouth of the user is wide open and the eyebrows indicate anger as shown in the graph 1004. As shown on graph 1008 the RTE has increased the size of the avatar's head, made the eyebrows bushier, and further opened up the user's mouth. The user's eyes could also be animated with flames and/or turned a menacing shade of red to further convey anger.

Another example of where video feedback could be used to augment a RTE is in a vomiting RTE. After the triggering of the vomit RTE the video camera 102C can monitor the user's mouth only allowing vomit to spew forth from the avatar if the user's mouth is open. Along the same vein, if the user's mouth remains closed, the RTE could be animated to show the avatars cheeks expanding and face turning green. The listed examples are not a complete list of the possible effects that could be enhanced by feedback from the video camera 102C and the microphones 102B and 102C. It should be understood that there are countless different embodiments where the use of a microphone and camera for feedback can enhance RTE.

The video camera 102C could also be used to provide input to the computer system 100 to improve avatar interaction. In one embodiment the user 200 could enable the video camera to periodically capture their facial expression and have the computer system 100 automatically best match the expression within a predefined library and appropriately update the avatar. In another embodiment the video camera could also provide a small live image of the user 200 that is displayed to remote users. Providing a small live image allows users to visually see the remote users while also enjoying the automated and manually inputted responses of the avatars.

Figure 11:
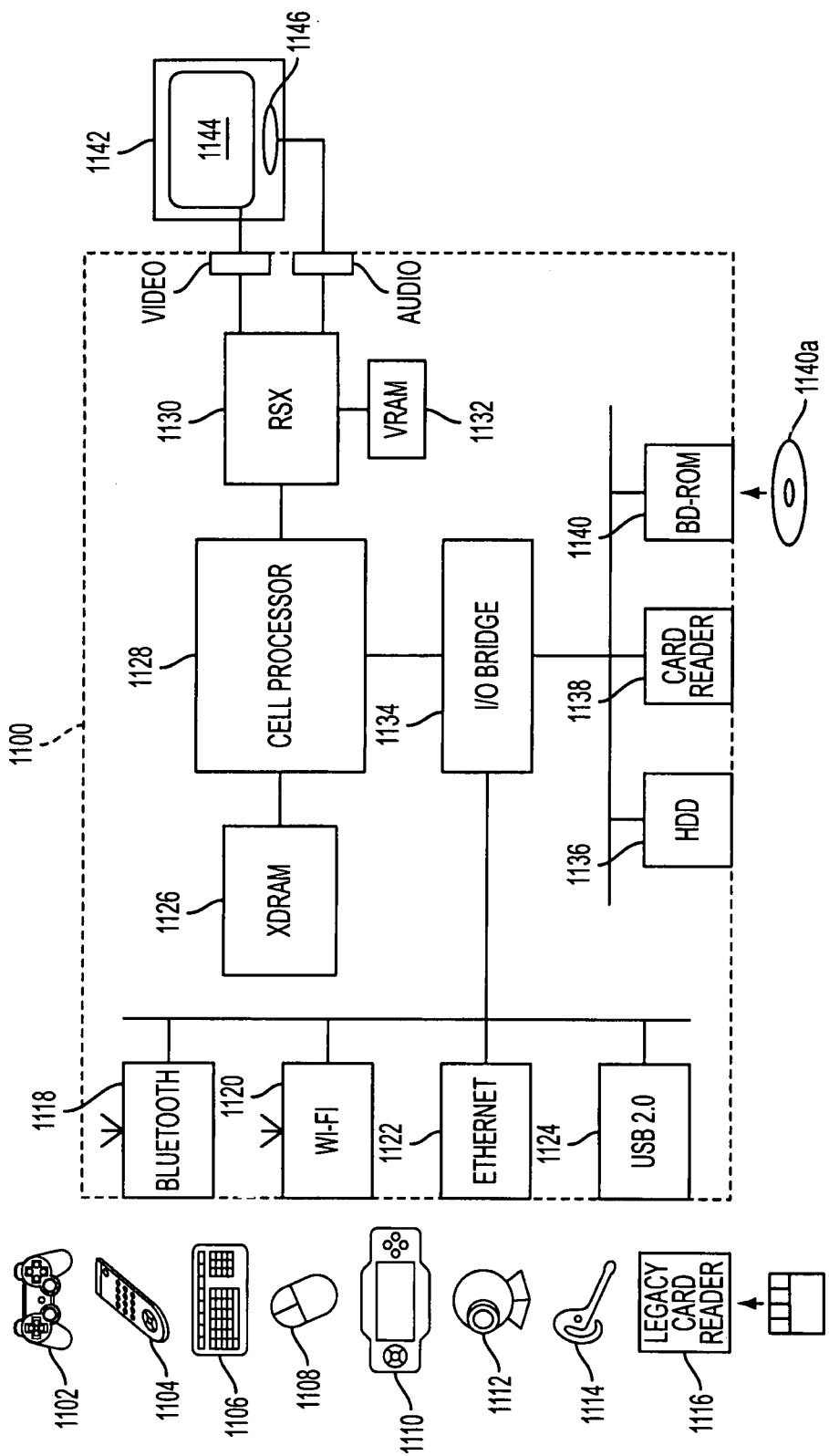
FIG. 11 schematically illustrates the overall system architecture of the Sony® Playstation 3® entertainment device, a console that may be compatible with controllers for implementing an avatar control system in accordance with one embodiment of the present invention.

FIG. 11 schematically illustrates the overall system architecture of the Sony® Playstation 3® entertainment device, a console that may be compatible with controllers for implementing an avatar control system in accordance with one embodiment of the present invention. A system unit 1100 is provided, with various peripheral devices connectable to the system unit 1100.The system unit 1100 comprises: a Cell processor 1128; a Rambus® dynamic random access memory (XDRAM) unit 1126; a Reality Synthesizer graphics unit 1130 with a dedicated video random access memory (VRAM) unit 1132; and an I/O bridge 1134. The system unit 1100 also comprises a Blu Ray® Disk BD-ROM® optical disk reader 1140 for reading from a disk 1140a and a removable slot-in hard disk drive (HDD) 1136, accessible through the I/O bridge 1134. Optionally the system unit 1100 also comprises a memory card reader 1138 for reading compact flash memory cards, Memory Stick® memory cards and the like, which is similarly accessible through the I/O bridge 1134.

The I/O bridge 1134 also connects to six Universal Serial Bus (USB) 2.0 ports 1124; a gigabit Ethernet port 1122; an IEEE 802.11b/g wireless network (Wi-Fi) port 1120; and a Bluetooth® wireless link port 1118 capable of supporting of up to seven Bluetooth connections.

In operation the I/O bridge 1134 handles all wireless, USB and Ethernet data, including data from one or more game controllers 1102. For example when a user is playing a game, the I/O bridge 1134 receives data from the game controller 1102 via a Bluetooth link and directs it to the Cell processor 1128, which updates the current state of the game accordingly.

The wireless, USB and Ethernet ports also provide connectivity for other peripheral devices in addition to game controllers 1102, such as: a remote control 1104; a keyboard 1106; a mouse 1108; a portable entertainment device 1110 such as a Sony Playstation Portable® entertainment device; a video camera such as an EyeToy® video camera 1112; and a microphone headset 1114. Such peripheral devices may therefore in principle be connected to the system unit 1100 wirelessly; for example the portable entertainment device 1110 may communicate via a Wi-Fi ad-hoc connection, whilst the microphone headset 1114 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 11 16 may be connected to the system unit via a USB port 1124, enabling the reading of memory cards 1 148 of the kind used by the Playstation® or Playstation 2® devices.

In the present embodiment, the game controller 1102 is operable to communicate wirelessly with the system unit 1100 via the Bluetooth link. However, the game controller 1102 can instead be connected to a USB port, thereby also providing power by which to charge the battery of the game controller 1102. In addition to one or more analog joysticks and conventional control buttons, the game controller is sensitive to motion in six degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1104 is also operable to communicate wirelessly with the system unit 1100 via a Bluetooth link. The remote control 1104 comprises controls suitable for the operation of the Blu RayTM Disk BD-ROM reader 1140 and for the navigation of disk content.

The Blu RayTM Disk BD-ROM reader 1140 is operable to read CD-ROMs compatible with the Playstation and PlayStation 2 devices, in addition to conventional pre-recorded and recordable CDs, and so-called Super Audio CDs. The reader 1140 is also operable to read DVD-ROMs compatible with the Playstation 2 and PlayStation 3 devices, in addition to conventional pre-recorded and recordable DVDs. The reader 1140 is further operable to read BD-ROMs compatible with the Playstation 3 device, as well as conventional pre-recorded and recordable Blu-Ray Disks.

The system unit 1100 is operable to supply audio and video, either generated or decoded by the Playstation 3 device via the Reality Synthesizer graphics unit 1130, through audio and video connectors to a display and sound output device 1142 such as a monitor or television set having a display 1144 and one or more loudspeakers 1146. The audio connectors 1150 may include conventional analogue and digital outputs whilst the video connectors 1152 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1128. The Playstation 3 device's operating system supports Dolby®5.1 surround sound, Dolby® Theatre Surround (DTS), and the decoding of 7.1 surround sound from Blu-Ray® disks.

In the present embodiment, the video camera 1112 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1100. The camera LED indicator is arranged to illuminate in response to appropriate control data from the system unit 1100, for example to signify adverse lighting conditions. Embodiments of the video camera 1112 may variously connect to the system unit 1100 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 1100, an appropriate piece of software such as a device driver should be provided. Device driver technology is well-known and will not be described in detail here, except to say that the skilled man will be aware that a device driver or similar software interface may be required in the present embodiment described.

Figure 12:
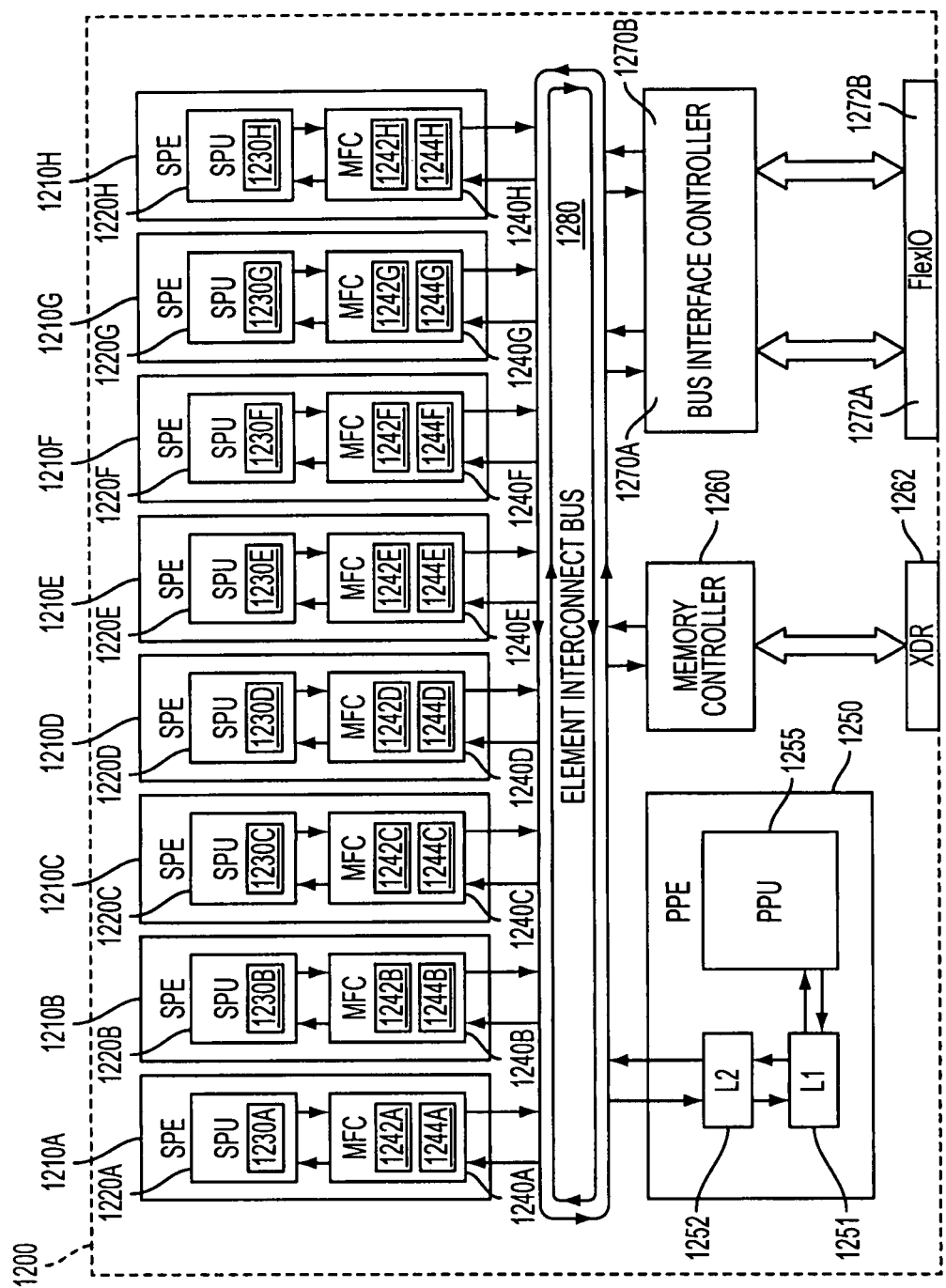
FIG. 12 schematically illustrates the architecture of the Cell processor, in accordance with one embodiment of the present invention.

Referring now to FIG. 12, the Cell processor 1128 has an architecture comprising four basic components: external input and output structures comprising a memory controller 1260 and a dual bus interface controller 1270A,B; a main processor referred to as the Power Processing Element 1250; eight co-processors referred to as Synergistic Processing Elements (SPEs) 1210A-H; and a circular data bus connecting the above components referred to as the Element Interconnect Bus 1280. The total floating point performance of the Cell processor is 218 GFLOPS, compared with the 6.2 GFLOPs of the Playstation 2 device's Emotion Engine.

The Power Processing Element (PPE) 1250 is based upon a two-way simultaneous multithreading Power 970 compliant PowerPC core (PPU) 1255 running with an internal clock of 3.2 GHz. It comprises a 512 kB level 2 (L2) cache and a 32 kB level 1 (L1) cache. The PPE 1250 is capable of eight single position operations per clock cycle, translating to 25.6 GFLOPs at 3.2 GHz. The primary role of the PPE 1250 is to act as a controller for the Synergistic Processing Elements 1210A-H, which handle most of the computational workload. In operation the PPE 1250 maintains a job queue, scheduling jobs for the Synergistic Processing Elements 1210A-H and monitoring their progress. Consequently each Synergistic Processing Element 1210A-H runs a kernel whose role is to fetch a job, execute it and synchronized with the PPE 1250.

Each Synergistic Processing Element (SPE) 1210A-H comprises a respective Synergistic Processing Unit (SPU) 1220A-H, and a respective Memory Flow Controller (MFC) 1240A-H comprising in turn a respective Dynamic Memory Access Controller (DMAC) 1242A-H, a respective Memory Management Unit (MMU) 1244A-H and a bus interface (not shown). Each SPU 1220A-H is a RISC processor clocked at 3.2 GHz and comprising 256 kB local RAM 1230A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 1220A-H does not directly access the system memory XDRAM 1126; the 64-bit addresses formed by the SPU 1220A-H are passed to the MFC 1240A-H which instructs its DMA controller 1242A-H to access memory via the Element Interconnect Bus 1280 and the memory controller 1560.

The Element Interconnect Bus (EIB) 1280 is a logically circular communication bus internal to the Cell processor 1128 which connects the above processor elements, namely the PPE 1250, the memory controller 1260, the dual bus interface 1270A,B and the 8 SPEs 1210A-H, totaling 12 participants. Participants can simultaneously read and write to the bus at a rate of 8 bytes per clock cycle. As noted previously, each SPE 1210A-H comprises a DMAC 1242A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 1260 comprises an XDRAM interface 1262, developed by Rambus Incorporated. The memory controller interfaces with the Rambus XDRAM 1126 with a theoretical peak bandwidth of 25.6 GB/s.

The dual bus interface 1270A,B comprises a Rambus FlexIO® system interface 1272A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 1134 via controller 1272A and the Reality Simulator graphics unit 1130 via controller 1272B.

Data sent by the Cell processor 1128 to the Reality Simulator graphics unit 1130 will typically comprise display lists, being a sequence of commands to draw vertices, apply textures to polygons, specify lighting conditions, and so on.

Embodiments may include capturing depth data to better identify the real-world user and to direct activity of an avatar or scene. The object can be something the person is holding or can also be the person's hand. In the this description, the terms "depth camera" and "three-dimensional camera" refer to any camera that is capable of obtaining distance or depth information as well as two-dimensional pixel information. For example, a depth camera can utilize controlled infrared lighting to obtain distance information. Another exemplary depth camera can be a stereo camera pair, which triangulates distance information using two standard cameras. Similarly, the term "depth sensing device" refers to any type of device that is capable of obtaining distance information as well as two-dimensional pixel information.

Recent advances in three-dimensional imagery have opened the door for increased possibilities in real-time interactive computer animation. In particular, new "depth cameras" provide the ability to capture and map the third-dimension in addition to normal two-dimensional video imagery. With the new depth data, embodiments of the present invention allow the placement of computer-generated objects in various positions within a video scene in real-time, including behind other objects.

Moreover, embodiments of the present invention provide real-time interactive gaming experiences for users. For example, users can interact with various computer-generated objects in real-time. Furthermore, video scenes can be altered in real-time to enhance the user's game experience. For example, computer generated costumes can be inserted over the user's clothing, and computer generated light sources can be utilized to project virtual shadows within a video scene. Hence, using the embodiments of the present invention and a depth camera, users can experience an interactive game environment within their own living room. Similar to normal cameras, a depth camera captures two-dimensional data for a plurality of pixels that comprise the video image. These values are color values for the pixels, generally red, green, and blue (RGB) values for each pixel. In this manner, objects captured by the camera appear as two-dimension objects on a monitor.

Embodiments of the present invention also contemplate distributed image processing configurations. For example, the invention is not limited to the captured image and display image processing taking place in one or even two locations, such as in the CPU or in the CPU and one other element. For example, the input image processing can just as readily take place in an associated CPU, processor or device that can perform processing; essentially all of image processing can be distributed throughout the interconnected system. Thus, the present invention is not limited to any specific image processing hardware circuitry and/or software. The embodiments described herein are also not limited to any specific combination of general hardware circuitry and/or software, nor to any particular source for the instructions executed by processing components.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The present invention may be used as presented herein or in combination with other user input mechanisms and notwithstanding mechanisms that track the angular direction of the sound and/or mechanisms that track the position of the object actively or passively, mechanisms using machine vision, combinations thereof and where the object tracked may include ancillary controls or buttons that manipulate feedback to the system and where such feedback may include but is not limited light emission from light sources, sound distortion means, or other suitable transmitters and modulators as well as buttons, pressure pad, etc. that may influence the transmission or modulation of the same, encode state, and/or transmit commands from or to the device being tracked.

The invention may be practiced with other computer system configurations including game consoles, gaming computers or computing devices, hand-held devices, microprocessor systems, microprocessor-based or programmable consumer electronics, minicomputers, mainframe computers and the like. The invention may also be practiced in distributing computing environments where tasks are performed by remote processing devices that are linked through a network. For instance, on-line gaming systems and software may also be used.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium may be any data storage device that can store data, which can thereafter be read by a computer system. Examples of the computer readable medium include hard drives, network attached storage (NAS), read-only memory, random-access memory, FLASH based memory, CD-ROMs, CD-Rs, CD-RWs, DVDs, magnetic tapes, and other optical and non-optical data storage devices. The computer readable medium can also be distributed over a network coupled computer systems so that the computer readable code may be stored and executed in a distributed fashion.

Although the foregoing invention has been described in some detail for purposes of clarity of understanding, it will be apparent that certain changes and modifications may be practiced within the scope of the embodiments defined herein. Accordingly, the present embodiments are to be considered as illustrative and not restrictive, and the invention is not to be limited to the details given herein, but may be modified within the scope and equivalents of the described embodiments.

What is claimed is:

1. A computer implemented method for interactively animating an avatar in response to real world input, data of the avatar transmitted between a first user and a second user using a computer program that is executed on at least one computer in a computer network and each of the first user and the second user interacting through a respective computing system that is at least partially executing the computer program, comprising:
    identifying components of the avatar representing the first user that can be modified using real-time effects;
    identifying controller input from the second user, the controller input being detected by the computing system, and the controller input indicating a selection of one of the identified components of the avatar representing the first user to be modified during play of a game between the first user and the second user, wherein the second user that provides the controller input is capable of interacting via one or more computer processors with the first user and the first user is capable of interacting via one or more computer processors with the second user;
    applying the real-time effects onto the selected component of the avatar representing the first user in response to the identified controller input, the applying of the real-time effects onto the identified components acting to augment the avatar of the first user;
    providing for display the avatar of the first user, having the applied real-time effects, on a screen connected to the computing system of one or both of the first and second users; and
    tracking movements of the first user so that the tracked movements are followed by the avatar of the first user when displayed;
    wherein the real-time effects applied onto the selected component of the avatar of the first user move with the movement of the avatar of the first user.

2. The computer implemented method of claim 1,
    wherein identifying components of the avatar representing the first user includes identifying pixel regions of the avatar to identify characteristics of the avatar representing the first user;
    wherein tracking movements of the first user includes tracking the pixel regions over one or more frames, the method further comprising:
    applying changes to pixel data contained in the pixel regions so that the avatar is interactively modified.

3. The computer implemented method as described in claim 1, further comprising:
    providing a video capture system interfaced with the computer program;
    capturing real-time video of the first user;
    processing the real-time video to identify at least one facial expression of the first user;
    periodically updating a facial expression of the avatar representing the first user to correspond with the facial expression of the first user.

4. The computer implemented method of claim 3, wherein the video capture system includes a camera that captures image frames and digitizes the image frames to define a pixel map of the image frames.

5. The computer implemented method of claim 4, wherein a location of eyes of the first user is used to determine facial characteristics that define the facial expression of the first user.

6. The computer implemented method of claim 1, wherein the controller input is defined by user selection of one of button presses, motion, light indicators, relative positional movement, or a combination thereof.

7. The computer implemented method of claim 6, wherein the controller input detected by the computing system is via a wired or wireless link.

8. The computer implemented method of claim 1, wherein the controller input is mapped to the selected component of the avatar.

9. The computer implemented if claim 1, further comprising:
    providing an audio capture system interfaced with the computer program;
    capturing real-time audio of the ambient sounds within an environment associated with the first user;
    processing the ambient sounds to identify particular sounds;
    automatically applying real-time effects to avatars representing the first user or the second user in response to the identified particular sounds within the ambient sounds.

10. The computer implemented method as described in claim 9, wherein the audio capture system includes an array of unidirectional microphones that capture sounds from different portions of the environment associated with the first user.

11. A computer implemented method for interactively applying animation onto users in response to real world input, data being transmitted between a first user and a second user using a computer program that is executed on at least one computer in a computer network and each of the first user and the second user interacting through a respective computing system that is at least partially executing the computer program, comprising:
    identifying components of an image of the second user that can be modified using real-time effects;
    identifying controller input from the first user, the controller input being detected by the computing system, and the controller input indicating a selection of one of the identified components of the image of the second user to be modified during play of a game between the first user and the second user, wherein the first user that provides the controller input is capable of interacting via one or more computer processors with the second user and the second user is capable of interacting via one or more computer processors with the first user;

applying the real-time effects onto the selected component of the image of the second user in response to the identified controller input, the applying of the real-time effects onto the selected component acting to augment the image of the second user, without permission of the second user to cause a taunting effect by the first user;

while enabling interactive communication between the first and second users, providing for display the image of the second user, having the applied real-time effects, on a screen connected to the computing system of one or both of the first and second users; and tracking movements of the second user so that the real-time effects applied onto the image of the second user move as does the second user.

12. A computer implemented method of claim 11, wherein the interactive communication is one of a chat communication enabled during an interactive game session played by the first and second users.

13. A computer implemented method of claim 12, wherein the interactive game session is displayed on a screen while also displaying an image or video of the first and second users.

14. A computer implemented method of claim 12, wherein the image of the second user or an image of the first user is either a real video captured image or an avatar rendition thereof.

15. A method for modifying an avatar, the method comprising:

providing a first region for display of a first image, the first image representing a first user;

providing a second region for display of a second image, the second image representing a second user;

providing a third region for display of a shared interactive application, the shared interactive application facilitating an interaction between the first user and the second user, wherein the first, second, and third regions are provided for display on a display screen;

receiving a controller input from the first user, the controller input indicating a selection of a component of the second image to be modified;

applying real-time effects to the second image in response to receiving the controller input, wherein applying the real-time effects to the second image is performed to modify the selected component of the second image, wherein applying the real-time effects to the second image is performed during a session of interaction between the first user and the second user via the shared interactive application; and tracking movements of the second user so that the real-time effects applied onto the second image of the second user moves as does the second user;

wherein the first image is a captured image of the first user or an avatar representing the first user;

wherein the second image is a captured image of the second user or an avatar representing the second user.

16. The method of claim 15, wherein the shared interactive application includes an online game.

17. The method of claim 15, wherein the shared interactive application includes an online chat application.

18. The method of claim 15, wherein the first image is a video of the first user or a still image of the first user.

19. The method of claim 15, wherein the second image is a video of the second user or a still image of the second user.

* * * * *